(12) United States Patent
Packer

(10) Patent No.: US 9,340,881 B2
(45) Date of Patent: May 17, 2016

(54) HYDROGEN/OXYGEN ON-DEMAND SYSTEM, HIGH SPEED EFFICIENT HYDROGEN REACTOR SYSTEM AND METHODS THEREFOR

(71) Applicant: David Packer, West Hills, CA (US)

(72) Inventor: David Packer, West Hills, CA (US)

( * ) Notice: Subject to any disclaimer, the term of this patent is extended or adjusted under 35 U.S.C. 154(b) by 0 days.

(21) Appl. No.: 14/350,350

(22) PCT Filed: Oct. 8, 2012

(86) PCT No.: PCT/US2012/059262
§ 371 (c)(1),
(2) Date: Apr. 7, 2014

(87) PCT Pub. No.: WO2013/052957
PCT Pub. Date: Apr. 11, 2013

(65) Prior Publication Data
US 2015/0159284 A1    Jun. 11, 2015

Related U.S. Application Data

(60) Provisional application No. 61/544,861, filed on Oct. 7, 2011.

(51) Int. Cl.
| | | |
|---|---|---|
| *C25B 15/02* | (2006.01) | |
| *C25B 1/04* | (2006.01) | |
| *C25B 9/00* | (2006.01) | |
| *C25B 9/08* | (2006.01) | |
| *C25B 1/06* | (2006.01) | |
| *F02M 25/12* | (2006.01) | |
| *C25B 9/06* | (2006.01) | |
| *C25B 15/08* | (2006.01) | |

(52) U.S. Cl.
CPC ... *C25B 1/04* (2013.01); *C25B 1/06* (2013.01); *C25B 9/06* (2013.01); *C25B 9/08* (2013.01); *C25B 15/02* (2013.01); *C25B 15/08* (2013.01); *F02M 25/12* (2013.01); *Y02E 60/366* (2013.01); *Y02T 10/121* (2013.01)

(58) Field of Classification Search
CPC ........ Y02E 60/366; C25B 15/02; C25B 1/04; C25B 15/00; C25B 9/00; C02F 2201/4612
USPC .................... 204/228.2, 228.4, 242
See application file for complete search history.

(56) References Cited

U.S. PATENT DOCUMENTS

| | | | |
|---|---|---|---|
| 2002/0023836 A1* | 2/2002 | Byron et al. ................... | 204/266 |
| 2004/0074781 A1* | 4/2004 | Klein ............................. | 205/628 |
| 2005/0029119 A1* | 2/2005 | Casey et al. ................... | 205/628 |
| 2005/0072688 A1* | 4/2005 | Meltser .......................... | 205/628 |
| 2009/0283420 A1* | 11/2009 | Schadeck et al. ............. | 205/633 |
| 2010/0065419 A1* | 3/2010 | Richardson ................ | 204/228.2 |
| 2010/0288212 A1* | 11/2010 | Williams ........................ | 123/3 |

* cited by examiner

*Primary Examiner* — Zulmariam Mendez

(57) ABSTRACT

A system for improving efficiency in which water or aqueous solution is broken into its core molecules of hydrogen and oxygen using a 12 volt power source, and of which this gas vapor can improve the efficiency of an engine of a vehicle in a catalytic fashion once combining with a fossil fuel, and includes a reactor housing containing at least one reactor unit having electrodes slotted in an insulated container, a solution supply system that regulates the aqueous solution in the system; and an air handling system that regulates the decomposed hydrogen and oxygen gas in the system. The reactor unit being immersed in an liquid or aqueous solution produces hydrogen and oxygen through electrolysis.

1 Claim, 28 Drawing Sheets

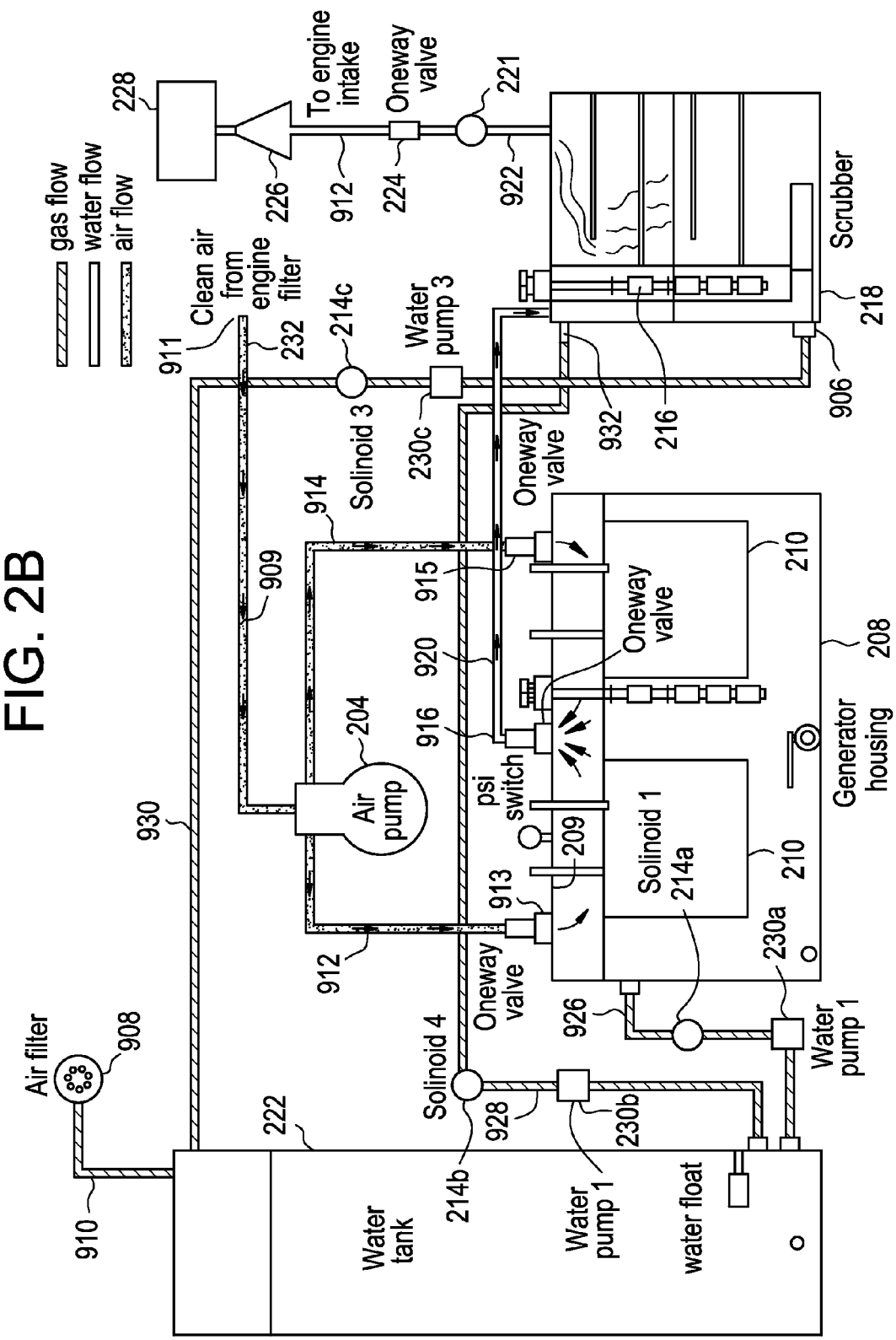

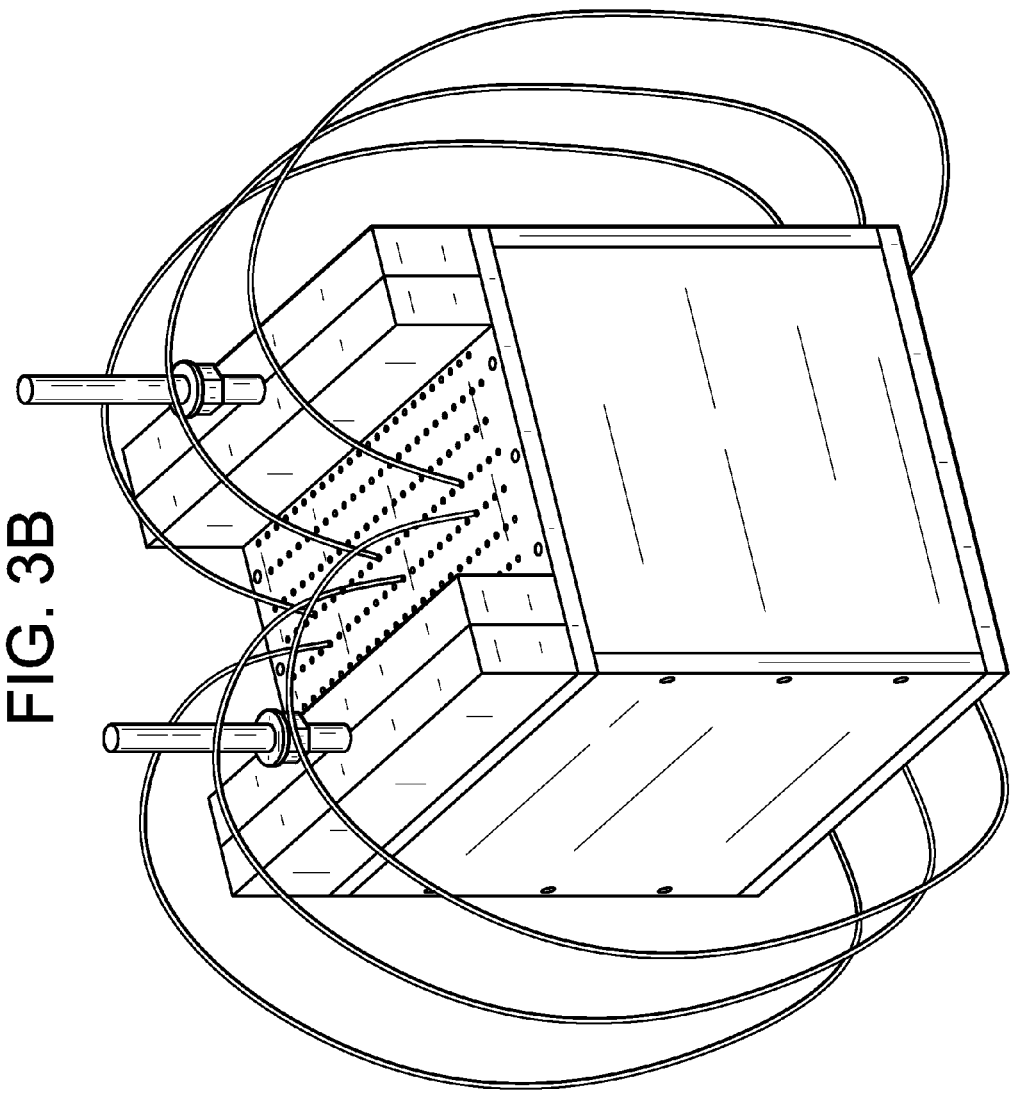

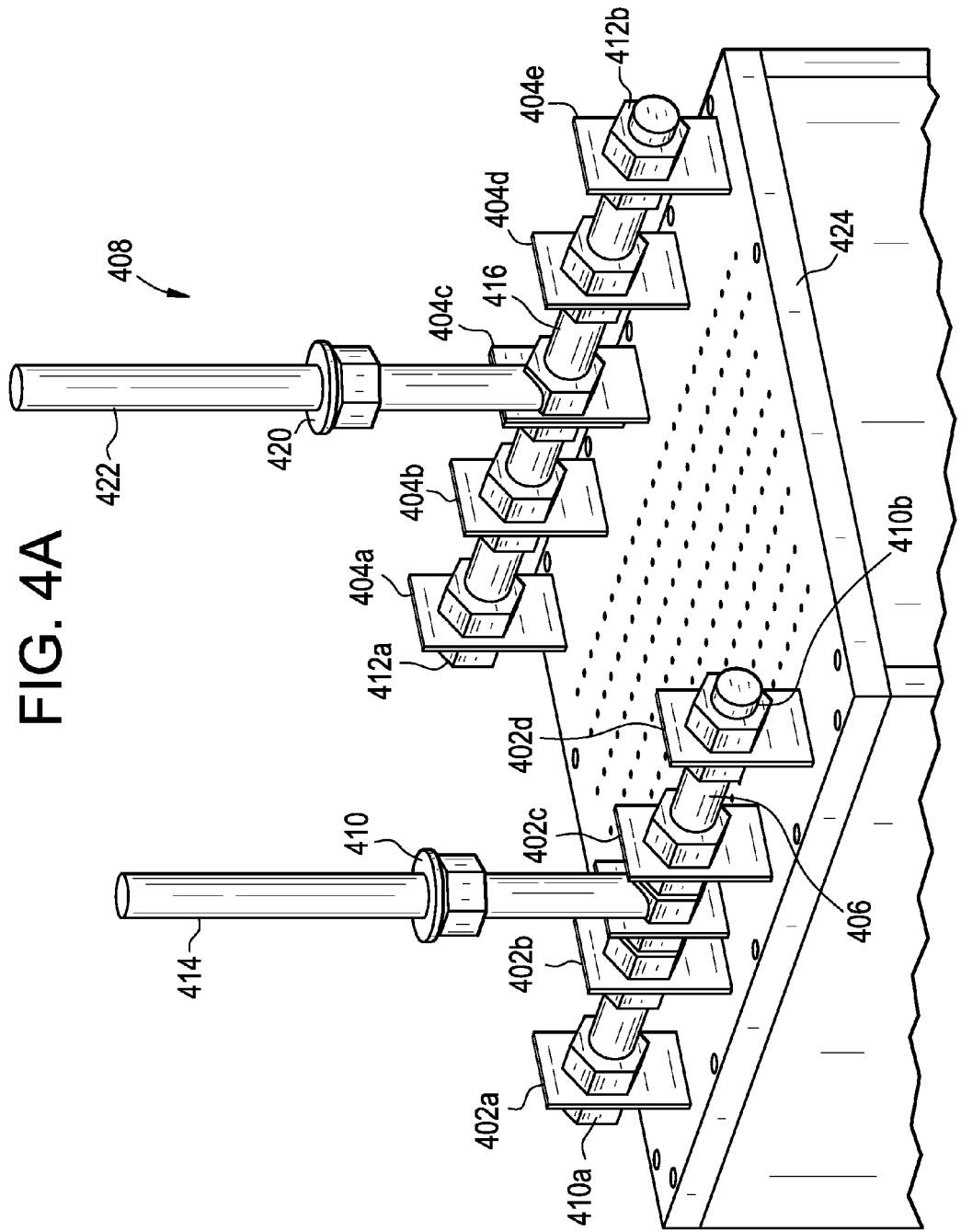

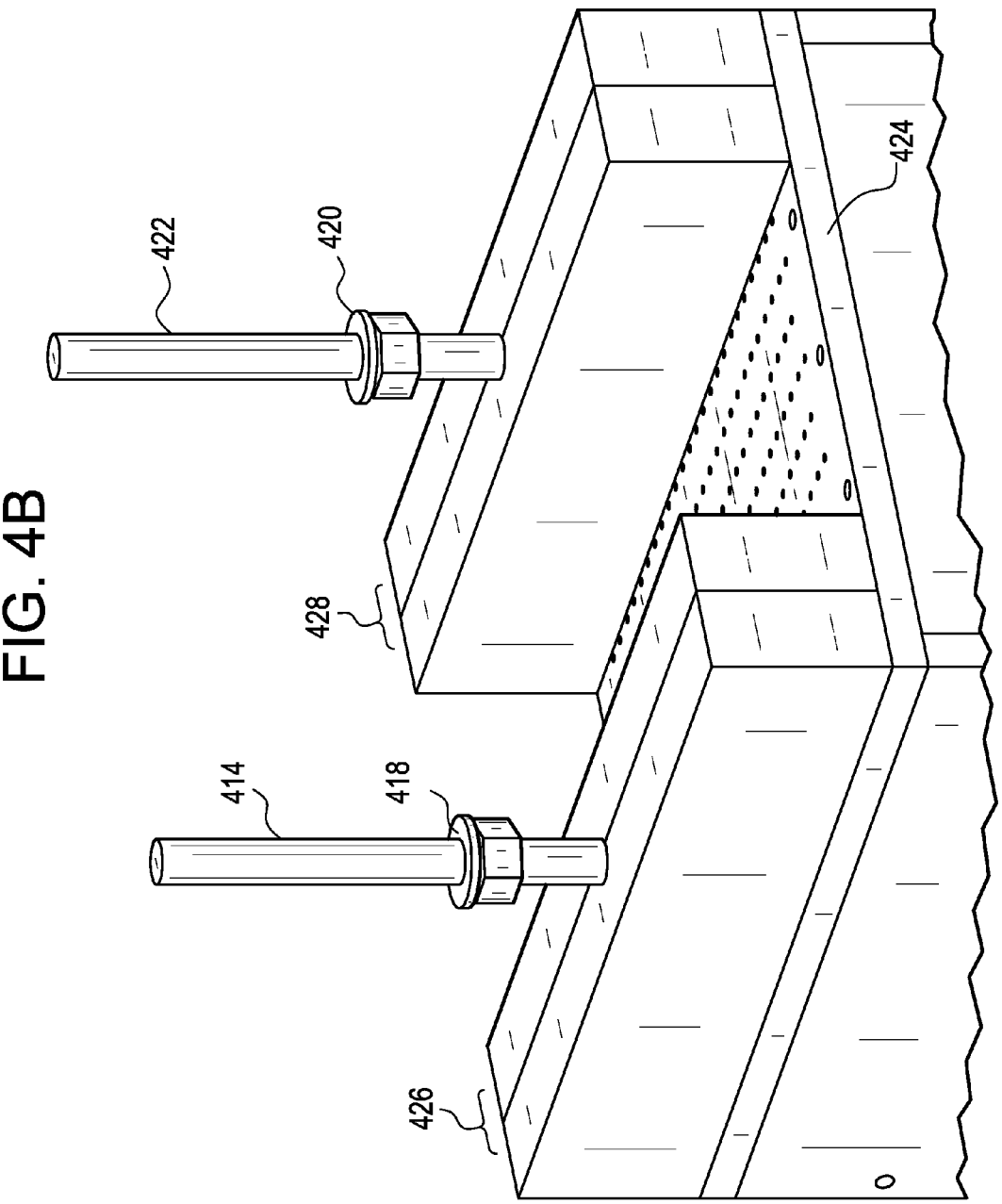

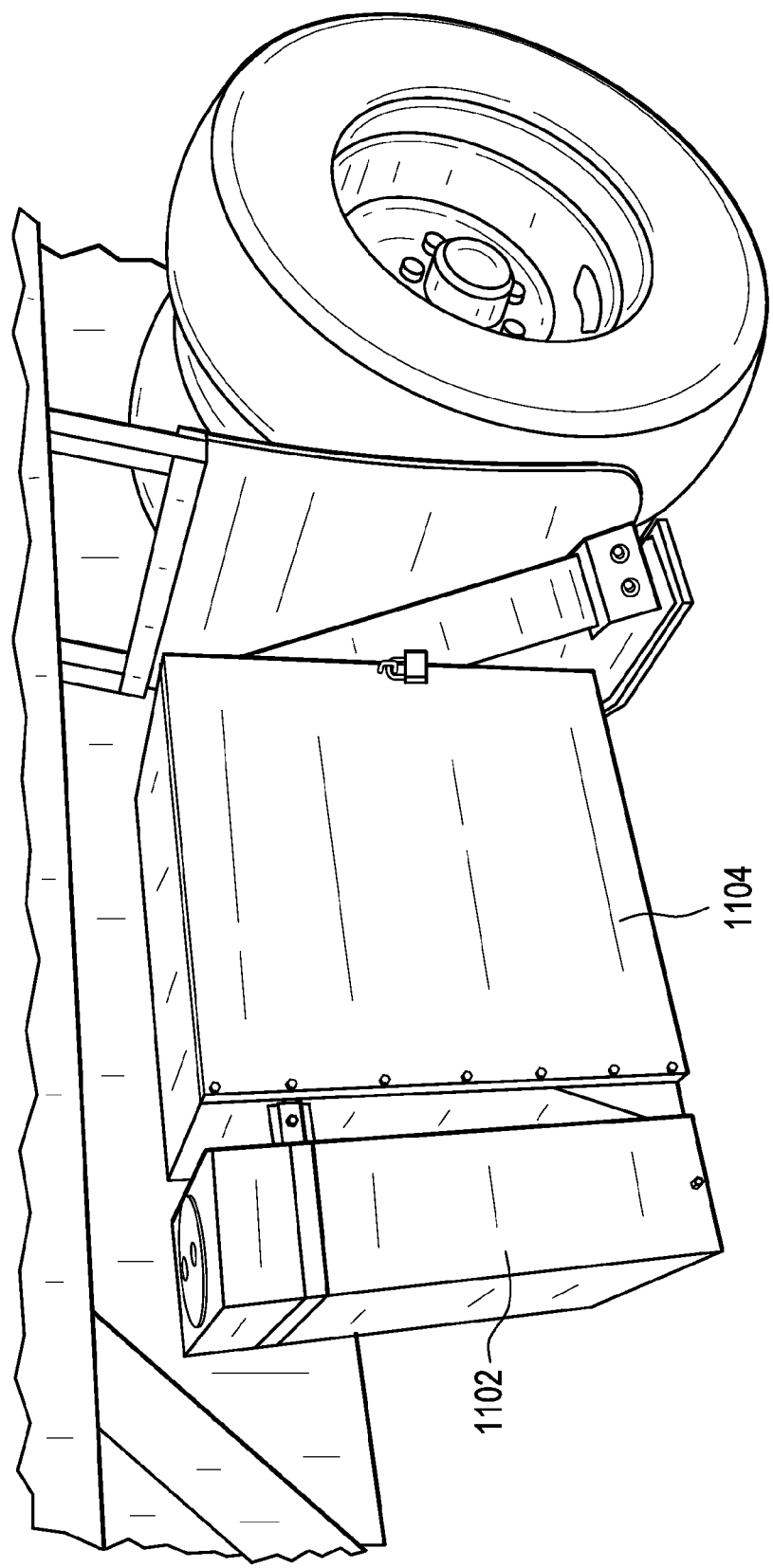

HYDROGEN/OXYGEN ON-DEMAND SYSTEM, HIGH SPEED EFFICIENT HYDROGEN REACTOR SYSTEM AND METHODS THEREFOR

CROSS-REFERENCE TO RELATED APPLICATION

This application is National Phase of international Application PCT/US12/59262, with an international filing date of Oct. 8, 2012, and which claims priority to U.S. patent application Ser. No. 13/647,306, filed on Oct. 8, 2012, the entirety of which is herein incorporated by reference, and U.S. Patent Application No. 61/544,861 filed on Oct. 7, 2011, the entirety of which is Herein incorporated by reference.

DESCRIPTION OF RELATED ART

Vehicle hydrogen generation retrofit kits have been tested but without success due to technological difficulties. Prior electrolysis systems, mainly concerning the Booster, or Reactors, were not very efficient at controlling the electrical reaction. Two technology directions are mainly used concerning the Booster/Reactor build. These systems use electricity and a catalyst in water such as Sodium Hydroxide or Potassium Hydroxide to increase electrical conduction and thus increasing the rate and moles of water electrolyzed into hydrogen and oxygen. The rate of gas decomposition depends on how efficient and well built the booster/reactor is designed and built. In general, the retrofit kit may be categorized into Dry Cell or Wet Cell.

Dry Cell (Booster/Reactor) Construction: A set of stainless steel plates (number of plates may vary from build to build) are held together, side-by-side with rubber gaskets between each plate towards the edge, and four stainless bolts running between to larger outside plates located at each corner, and running along beside the stack of plates. One or more openings in the bottom of each plate allow water passage between the plates, and one or more openings at the top of the plates to allow hydrogen/oxygen gas between the plates. On the outer plates on either side, there is a larger opening at the bottom for water intake and a larger opening at the top for exhausting gas. This assembly is sealed so the water stays between the plates and the gas stays between the plates, thus the term Dry Cell, that is to say, not submersed in a vessel of water.

Wet Cell (Booster/Reactor) Construction: A set of stainless steel plates (number of plates may vary from build to build) are held together side-by-side with rubber gaskets between each plate around the edge, and four stainless bolts penetrating through all of the plates in the corners of each plate, and these bolts have a Teflon or rubber sleeve to insulate the bolt form the plates in which it penetrates. The difference between this assembly and the Dry Cell is that the in a Dry Cell construction, the cell is dry and water is pumped into the plates by a hose, whereas the Wet Cell is submersed in water which migrates between the plates.

With both methods listed above, problems arise from their respective activity. In the Dry Cell, water control is a problem. If the water is allowed to remain high in the Dry Cell, then there is a chance of the water being delivered to the targeted usage (motor or other usage). Additionally, as there is no insulation around the cell, there is significant possibility of heat loss, costing more energy to gain the results then necessary. Also, corrosion of the interior plates can build up between the plates, causing debris between the plates, which results in shunting of current between the plates and additional loss of energy not going toward decomposition of water solely. The rubber seals between the plates break down over time causing leaks of water and gas making the Dry Cell unreliable over time. Thus this build can be unreliable and is potentially dangerous.

The Wet Cell construction also has significant issues concerning durability's and performance. While submersed in water the plates, when electrified, the Wet Cell loses electrical energy through the water in shunting and shorting. Over time the rubber gaskets breakdown and place debris in the circulating water, which causes more shunting and shorting of the plates from edge to edge and to the walls and through the water. These activities speed up the oxidation of the materials causing more rapid acceleration of the deterioration of the gaskets and the shunting/shorting effect. As these effects occur less gas is decomposed and more energy is used causing a run-away amperage build and electrical draw on the supporting electrical system. Additionally, the bolts through the plates cause shorting and shunting if any of the insulation covering the bolts deteriorates or melts. The holes cut in the plates for the bolts to pass through have edges that are not insulated and therefore become edges for additional shorting. All shunting and shorting in the reaction area interferes with the production of viable hydrogen and oxygen decomposition and alters the chemistry. This alteration causing a foaming which the releases the gas, water and catalyst (e.g., Sodium Hydroxide or Potassium Hydroxide). This foaming effect decreases the efficiency and causes another problem of potential delivery of this material to the target system i.e. a vehicle engine or power generator. This issue also creates an imbalance in stabilizing the catalyst for amperage setting, making it difficult to set the system at a particular value and causing increased usage of the catalyst, thereby making the system less safe and environmentally friendly. This increased use of either catalyst causes increased instability and deterioration of the plates and compounds used in the build, and in most cases can cause catastrophic deterioration of the cell and booster/reactor components in a short period of time. This results in reduced decomposition of water at an increased energy cost, less durability, higher maintenance, and ultimately, a catastrophic failure of the device.

Attempts have been made to address the problems attendant to both Wet and Dry Cell construction, but such solutions have been remedial "band-aids." All power systems to manage the electricity to the booster/reactors are based on these remedial builds have additional problems due to that particular build. The same goes for all other systems in the over-all system, including the air filtration and delivery system, the safety control systems, the as delivery system, water control system, etc.

Additionally, both systems outlined above also cause other manufacturing concerns, and have other issues in their over-all system development. For example, wiring has been insufficient in almost every circumstance, and burned out in a short time when low/light levels of current were run through them. Mounting of systems were also insufficiently handled and in sonic cases systems broke their designed mounting brackets, because of poor design. These systems also failed to handle vibration transferred through the frame of a mobile vehicle when in use. Moreover, poor electrical wiring was insufficient to handle the power the manufacturer suggests for the booster/reactors travels through the dash gauge set-ups of mobile vehicle applications, endangering the vehicle dashboard with possible fires and electrical damage. No air filtration systems are put into place for the air intake of the booster/reactors, allowing impurities into the booster/reactors and causing additional inconsistencies in operational protocols and decomposition, as well as increased minerals, causing out of control amperage ramping and additional damages from this uncontrolled element in the system.

SUMMARY OF THE INVENTION

The present disclosure is directed to a system and methods for improving the efficiency and decomposition of water into its core molecules of hydrogen and oxygen, which can be used as an energy solution for to applications, devices, and methods. Embodiments of the present disclosure are directed to a system and method for improving efficiency of an engine of a vehicle, however as will be appreciated, embodiments of the systems, devices, and methods can be applied any energy consuming device or system making use of combustible fuel, including but not limited to a hydrogen on-demand system for all uses, for example: static generators, under the counter stove top gas production, a pool heater retrofit, small welding set-ups, engine clean-out cycle device. The system includes a reactor housing containing at least one reactor unit having electrodes slotted in an insulating container, a solution supply system that regulates the aqueous solution in the system, and an air handling system that regulates the produced hydrogen and oxygen gas in the system. The reactor unit being immersed in water or an aqueous solution produces hydrogen and oxygen through electrolysis.

According to embodiments of the present disclosure, the container and other components (e.g. covers, a generator housing top) are disclosed as comprising materials for an electrical insulator, for UHMW plastic or Teflon. However, embodiments include such components as made from other substantially non-conductive materials, for example, dielectric materials, porcelain, fiberglass or one or more polymers, including but not limited to acrylic, UHMW plastic, Teflon, ultra high molecular weight polymers.

According to embodiments, Sodium Hydroxide or Potassium Hydroxide are given as electrolytic catalysts, however embodiments also include the use of other bases, salts and acids usable as electrolytic catalysts, which are known in the art and are therefore not listed here.

According to an embodiment of the present disclosure, the electrodes include a conductive material, including materials selected from: conductive metals, stainless steel, Titanium, Nichol 200, Carbon Alloy, conducting ceramics, Indium tin oxide (ITO), lanthanum-doped strontium titanate (SLT), yttrium-doped strontium titanate (SYT), and carbon fiber conductive materials.

According to an embodiment of the present disclosure, the container includes a plurality of openings at the top and at the bottom of the container.

According to an embodiment of the present disclosure, the aqueous solution includes and electrolytic catalyst.

According to an embodiment of the present disclosure, the system includes at least one float switch for regulating a level of the aqueous solution.

According to an embodiment of the present disclosure, the system includes a plurality of pressure sensors.

According to an embodiment of the present disclosure, the air handling system filters air from the air intake line behind the air filter or the air intake of the air horn and directs the air to the generator housing.

According to an embodiment of the present disclosure, the air handling system combines a mixture of air, hydrogen gas, and oxygen gas, and water vapor, directs the mixture to a scrubber that lowers the vapor content by cooling the vapor, and directs the mixture to a Venturi of the engine.

According to an embodiment of the present disclosure, the system includes a power management system.

According to an embodiment of the present disclosure, the system includes a water tank.

According to an embodiment of the present disclosure, the system is a vehicle hydrogen retrofit kit.

According to an embodiment of the present disclosure, the circulation of water/aqueous solution forms a torus around the reactor unit due to the plurality of holes at the top and bottom of the reactor unit.

According to an embodiment of the present disclosure, the float switch includes a plurality or floats and magnetic switches.

According to an embodiment of the present disclosure, the polymeric container includes no glues.

According to an embodiment of the present disclosure, a vehicle battery or electrical source energizes the reactor.

According to an embodiment of the present disclosure, the system includes a scrubber part that breaks gas vapors into small bubbles.

According to an embodiment of the present disclosure, the system includes a cooling scrubber system that is configured to cool the gas produced by the reactor unit.

According to an embodiment of the present disclosure, the electrodes include a plurality of anodes and cathodes separated by neutral cathodes.

According to an embodiment of the present disclosure, the neutral cathodes include dielectric material, or polymer insulating material.

Described herein is a system and method therefor including reactors comprising embodiments that can comprise the following features:

i) Openings (e.g. holes) are eliminated from the interior reaction plates, anodes, cathodes, and neutrals, so that each electrolysis plate is solid in design.

ii) An electrically insulating enclosure or container made of substantially non-conductive materials, for example, dielectric materials, porcelain, fiberglass or one or more polymers, including but not limited to acrylic, UHMW plastic, Teflon, ultra high molecular weight polymers, or the like, is disclosed. The enclosure is configured to completely hold all plates at a substantially equal distance apart from each other. As will be appreciated, although the container is described in various embodiments as a polymeric, UHMW, or Teflon cube, the container can be any shape, and can be made of any sufficiently insulating material.

The cube holds one or more cathode/anode pairs. A minimum of one pair is acceptable, but a plurality can be used, for example 5. In an embodiment an arrangement comprises 6 neutrals and then a cathode or cathode/neutral/anode in arrangement. This sequence can repeat 8 times to complete the cube slotted interior. The cube interior therefore can comprise 57 slots and houses 5 cathodes, 4 anodes, and 48 neutrals.

iii) A cover or top for the cube is designed to close the cube to complete a perfectly fitting cube which separates each plate from another plates edge with no edges exposed anywhere. The anodes and cathodes protrude out of the top of the cube through slots. For example, in an embodiment a top for the cube is configured with slots configured such that the anodes and cathodes penetrate through to the exterior of the wall of the cube, and which is further engineered to a close fit, rendering the cube impervious when complete. The cube is thus configured, when complete, such that the plates are isolated in the cube, thereby protecting each plate's edge from another plate's edge with no edges exposed anywhere.

iv) Between each protruding plate is a separator/insulator having a plurality of openings such as perforations or holes. The separator between each plate comprises, for example number of holes (e.g. 5) that are a given size and are located on the bottom cube wall as well as the top cube wall. The bottom openings are for induction of water into each area between each plate on the bottom cube wall. The openings in the top cube wall between the plates are for the purpose of exhausting the hydrogen gas and oxygen gas and re-circulating aqueous solution out of the cube and back into the surrounding aqueous solution into the generator housing space above the cubes.

v) The pattern of openings in the bottom and the top walls creates a circulation of the water the reactors are submersed into in the stainless steel system generator housing where the reactors are bracketed, suspended above the generator floor and below the genera tot housing top. This circulation assists heat reduction passed out from between the plates into the volume of the water circulating around the reactors in the generator housing. This circulation of water from within the cube chambers to the outside surrounding water and back reduces friction of the gas babbles caused by the bubbles traveling up the plates in rapid succession and out of the exhaust openings.

vi) The cube is held together by a plurality of stainless steel screws anchored into each wall along each side of a given wall and penetrating into the wall underneath the screws for a total of 48 stainless steel screws holding 6 walls together as a cube. No sealants or polymer glues are required to be used in the construction, thus eliminating deterioration of other elements to contaminate the interior reactor water. The anodes and cathodes protruding from the cube are attached to a long stainless steel bolt connecting each anode together and another connecting each cathode together, and then a perpendicular stainless steel bolt protrudes upward from center of the inter-connected anodes and the inter-connected cathodes, which then exit the generator housing top. These anode and cathode assemblies are then either covered in a heavy duty insulator, for example a polymer paint such as Plastic Dip, which cures at room temperature to further insulate the electrical path and confine the electrical energy and further reducing thermal loss when the assembly is transporting electricity while submersed in an aqueous solution. The electrode assemblies are then covered with engineered electrically insulating covers, for example Teflon or UHMWP Plastic covers, described below, which screw into place completely covering either the anode or cathode assembly, thus more completely insulating the electrical path and lowering the thermodynamic loss and reducing the amount of base necessary to achieve the same electrical results decomposing the aqueous solution.

vii) in an embodiment, the protruding electrode assemblies are sealed and covered with electrically insulating covers. The anodes and cathodes extruding from the cube top attached are then connected anode-to-anode and cathode-to-cathode, and is connected using a connecting bolt. The connecting bolt is made of, for example, stainless steel. The connecting bolt locks to each anode or cathode lead, as for example by a nut tightened on either side of the lead, and then can be spot-welded for assured connectivity and conductivity. A second bolt is then connected, for example, by a weld fitting to a lead in the center of the connecting bolts for the anodes and the cathodes, and protrudes upward to penetrate out of the generator ceiling plate. The anode and cathode connection assembly as just described is now each covered by a insulator cover assembly, for example a fitted two piece assembly made of an Ultra-high-molecular-weight polyethylene (UHMW). Embodiments of the covers comprise covers made from other electrical insulators, for example, dielectric materials, porcelain, fiberglass or one or more polymers, including but not limited to acrylic, UHMW plastic, Teflon, ultra high molecular weight polymers. This two-piece UHMW assembly is held together as for example by 2 stainless steel screws. The UHMW covers to completely insulate the electrical conductivity of the assembly when submersed into liquid such as water or an aqueous solution. Although the assembly can be submersed in water alone, the term "aqueous solution" is used throughout this disclosure; it will be understood that liquids of water or aqueous solutions are within the scope of the disclosure. Before the UHMW assembly is screwed into place, the anodes and cathodes are treated to thermally seal and protect the electrode assembly. For example, in an embodiment the protruding electrode assemblies are painted with protective insulator such as Plasti Dip and allowed to dry at room temperature. Plasti Dip is a multi-purpose, air dry, specialty rubber coating. It can be easily applied by dipping, brushing, or spraying. Plasti Dip protective coating is ideal for a broad array of do-it-yourself projects around the home, garage, garden, and elsewhere. It protects coated items against moisture, acids, abrasion, corrosion, and skidding/slipping, and provides a comfortable, controlled grip. Plasti Dip remains flexible and stretchy over time, and will not crack or become brittle in extreme weather conditions. It has been tested and proven in temperatures from −30° F. to 200° F. This assures a substantially complete thermal seal around the entire anode and cathode assembly prior to covering the electrode assembly the UHMW assembly covers. Due to this complete insulation, the container is extremely efficient.

viii) A generator housing comprising a top or cover made of a substantially non-conductive polymer such as Teflon or UHMW Plastic eliminates potential metal-to-metal shorting between the anodes and cathodes and the stainless steel generator top penetration holes. During heavy usage, the entire system can be exposed to heavy vibrations from the vehicle chassis, therefore the polymeric top and the rubber protector's grommets protecting the anode and cathodes can wear through and short the anodes and cathodes to the top generator cover, thereby preventing electrical shorts. Additionally, using an insulating material such as UHMW allows for more thermal insulation of the generator interior, reducing heat loss to the exterior.

The improved construction produces no foaming of the gas and water out of the reactors. It also results in significant reduction in thermal losses from run away energy pathways i.e. electrical loss to the walls of the housing when they are steel, electrical loss due to shunting and shorting, out of control and ramping amperage causing increased thermal losses in the water and system, usage of less catalyst to achieve energy for decomposition. For example, when two cubes of such retrofit kits are energized by a 12 volt battery that is capable of producing 110 amps, these cubes decompose water at a rate of approximate 20.5 liters of combined hydrogen and oxygen gas per minute, demonstrating this system to be extremely efficient and fast.

Oxidation of the plates is significantly reduced to the point of strong durability, with no materials elements deteriorating and showing up in the water over time, nor does discoloration of the water occur over time.

Exemplary advantages of the embodiments as described herein include:

Increased thermal performance resulting in no foaming of the water when hydrogen and oxygen is decomposed from the water between the anode and cathode plates and above the reactor plates.

Reduced build up of oxidation byproducts between the anode and cathode plates and beneath the reactors.

Reduced deterioration of the stainless steel caused by oxidation.

A significant reduction in thermal losses from shunting and shorting in the reactors and around the reactors from the plates.

Reduced run away energy losses and amperage building daily due to the shunts, shorts, and oxidation effects.

Usage of less base or acid or electrolytic catalyst (e.g. such as Sodium Hydroxide) in the aqueous solution to achieve lower voltage and wattage to decompose water at prescribed values.

The ability to set variable decomposition values by adjusting levels of base, acid, or salts due to consistent decomposition within a contained known value.

Efficiency to a point of decomposing water at an low cost of electrical energy and without the use of Sodium Hydroxide or other base material as a catalyst when electricity is run to the anodes and cathodes (for example at 12V).

Oxidation of the plates is significantly reduced to the point of strong durability, with no materials elements visibly deteriorating and showing up in the water over long time period, for example exceeding a year, nor does discoloration of the water occur over time.

Throughout the specification and claims, the following terms take at least the meanings explicitly associated herein, unless the context dictates otherwise. The meanings identified below to not necessarily limit the terms, but merely provide illustrative examples for the terms. The phrase "an embodiment" as used herein does not necessarily refer to the same embodiment, though it may. In addition, the meaning of "a," "an," and "the" include plural references; thus, for example, "an embodiment" is not limited to a single embodiment but refers to one or more embodiments. Similarly, the phrase "one embodiment" does not necessarily refer the same embodiment and is not limited to a single embodiment. As used herein, the term "or" is an inclusive "or" operator, and is equivalent to the term "and/or," unless the context clearly dictates otherwise.

It is noted that in this disclosure and particularly in the claims and/or paragraphs, terms such as "comprises," "comprised," "comprising," and the like can have the meaning attributed to it in U.S. patent law; that is, they can mean "includes," "included," "including," "including, but not limited to" and the like, and allow for elements not explicitly recited. Terms such as "consisting essentially of" and "consists essentially of" have the meaning ascribed to them in U.S. patent law; that is, they allow for elements not explicitly recited, but exclude elements that are found in the prior art or that affect a basic or novel characteristic of the invention. Embodiments of the present invention are disclosed or are apparent from and encompassed by, the following description.

An advantage of the embodiments as disclosed herein is a reduction in diesel (or other fossil fuel) fuel used by combustion engines. As will be appreciated, uses include numerous and various platforms, for example: mobile vehicle usage (all mobile vehicles whether they are commercial or consumer), static generators, drilling platform engines, marine engine ocean vessels, and all other combustion engine usages as mentioned below. Other platforms can include under The counter HOD (UTC) (e.g., for stove top fuel), water heater fuel HOD, swimming pool HOD, manufacturing of fertilizer supplementation of large volume hydrogen Compressions Injection Oil Well Storage (CIOWS), Commercialization of Power Plant Supplementation (CPPS), commercial ocean vessels HOD, rail systems HOD, and so on.

An HOD engine reduces the amount of emissions they secrete (1) displacing certain amounts of the fuel normally used by an engine by creating more efficient combustion stimulated by the addition of hydrogen and pure oxygen, and (2) lowering emissions by the combusting the normal fuel used (any fossil fuel) more efficiently, so that emissions are augmented rather thane merely displaced. The addition of hydrogen in a combustion engine allows the engine to be operated in a leaner condition, thus reducing NOX emissions and all other pollutants.

Additionally, all combustion engines using this form of supplementation will have less friction material i.e. carbon in the oil, therefore allowing for a longer time between in-frame rebuilds, as well as resulting in a healthier engine having a longer life.

In conjunction with the increased efficiency, the HOD allows for a more explosive combustion dynamic because Hydrogen explodes much faster and more powerfully than fossil fuel. Hydrogen is also known to have a higher flame velocity than diesel or other fossil fuels. This results in increased engines power and better performance.

It will be appreciated by those skilled in the art that the foregoing brief description and the following detailed description are exemplary (i.e., illustrative) and explanatory of the present invention, but are not intended to be restrictive thereof or limiting of the advantages, which can be achieved by this invention in various implementations. Additionally, it is understood that the foregoing summary and ensuing detailed description are representative of some embodiments of the invention, and are neither representative nor inclusive of all subject matter and embodiments within the scope of the present invention. Thus, the accompanying drawings, referred to herein and constituting a part hereof, illustrate embodiments of this invention, and, together with the detailed description, serve to explain principles of embodiments of the invention.

BRIEF DESCRIPTION OF THE DRAWINGS

Embodiments are illustrated in the figures of the accompanying drawings, which are meant to be exemplary and not limiting, and in which like references are intended to refer to like or corresponding things.

FIGS. 2A-2B illustrate an exemplary implementations of the system described in FIG. 1 according to embodiments of the present disclosure.

FIG. 3B illustrates a reactor torus around the reactor unit according to an embodiment of the present disclosure.

FIG. 4A illustrates external cube anode and cathode configurations according to an embodiment of the present disclosure.

FIG. 4B illustrates cover assemblies of the external cube cathode and the anode according to an embodiment of the present disclosure.

FIG. 10 illustrates an installation of the present system on a truck according to an embodiment of the present disclosure.

DETAILED DESCRIPTION OF THE EMBODIMENT

Figure 1:
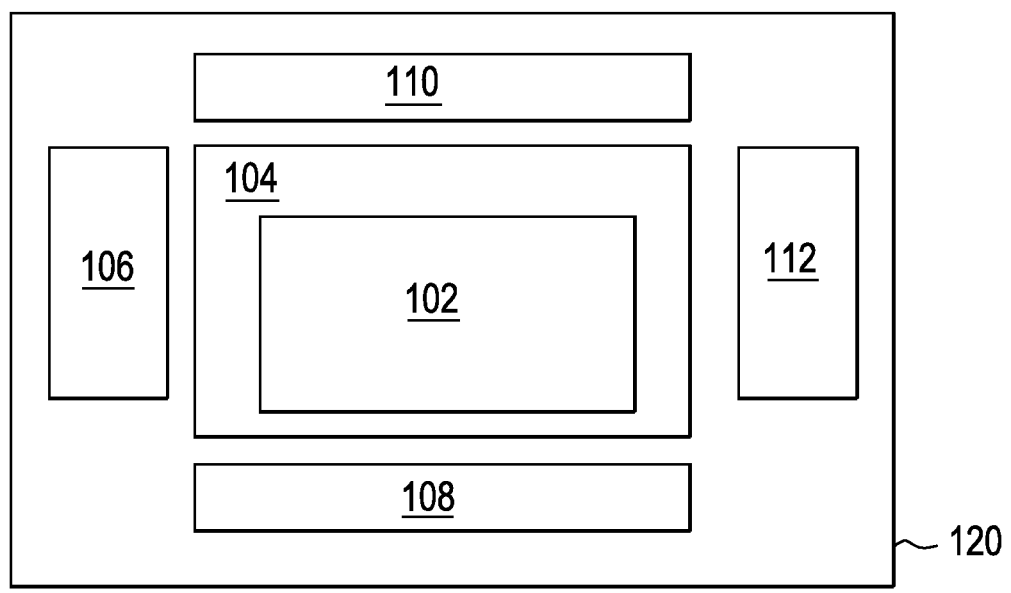
FIG. 1 illustrates an exemplary hydrogen generation and delivery system according to an embodiment of the present disclosure.

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However because such elements are well known in the art, and because they do not facilitate a better understanding of the present invention, a discussion of such elements is not provided herein.

The use of the terms "a," "an," "at least one," "one or more," and similar terms indicate one of a feature or element as well as more than one of a feature. The use of the term "the" to refer to the feature does not imply only one of the feature and element.

When an ordinal number (such as "first," "second," "third," and so on) is used as an adjective before a term, that ordinal number is used (unless expressly or clearly specified otherwise) merely to indicate a particular feature, such as to distinguish that particular feature from another feature that is described by the same term or by a similar term.

When a single device, article or other product is described herein, more than one device/article (whether or not they cooperate) may alternatively be used in place of the single device/article that is described. Accordingly, the functionality that is described as being possessed by a device may alternatively be possessed by more than one device/article (whether or not they cooperate). Similarly, where more than one device, article or other product is described herein (whether or not they cooperate), a single device/article may alternatively be used in place of the more than one device or article that is described. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

The present invention will now be described in detail on the basis of exemplary embodiments.

In an embodiment, disclosed is a system to decompose water into its core molecules of hydrogen and oxygen and then deliver the resulting gas vapor to an engine's combustion cycle. In an embodiment, the gas vapor is delivered through an air intake manifold. The hydrogen then joins the fossil fuel in the combustion chamber to be ignited, causing a catalytic ignition occurrence, allowing the combustion to occur more efficiently than it does with just the fossil fuel alone.

In an embodiment the system is comprised of 6 subsystems that make up the and over-all system, described herein as a Hydrogen On-Demand (HOD) system. In an embodiment, the subsystems are contained inside one system box or cabinet, although the subsystems need not be contained in a single cabinet so long as they are in operative connection. The cabinet can be made of structural material such as polymeric material, stainless steel, or the like. The system comprises a generator housing with one or more electrolysis reactors, which decompose filtered water (reverse osmosis and deionized water). In an embodiment, the water comprises a prescribed amount of Sodium Hydroxide diluted into its volume. The reactors are configured to operate when the engine is keyed on and when the oil pressure reaches a threshold minimum pressure value, for example of 10 lbs of pressure.

In an embodiment the reactors are enclosed in a protective and sealed container or enclosure for the electrode(s) of the cell. The container and other components comprises a substantially non-conductive insulating material, for example, dielectric materials, porcelain, fiberglass, insulated conductors or one or more polymers, including but not limited to acrylic, UHMW plastic, Teflon, ultra high molecular weight polymers. Embodiments of the container, although described throughout this disclosure as a cube, be any shape (e.g., rectangular, spherical, etc.).

The reactor cube can include conductive connectors of Stainless Steel, Nickel 200, Titanium or any other similarly conductive material, as well as including a range of conducting ceramics such as Indium tin oxide (ITO), lanthanum-doped strontium titanate (SLT), yttrium-doped strontium titanate (SYT), and carbon fiber conductive materials, etc. The insulating enclosure is further configured to use a fitted design requires no polymeric sealant, gaskets, or glues on any kind to maintain the seal, for example, but fitting the 6 walls of the cube.

The anode and cathode leads of the electrode protrude from the UHMW cube interior, and are panned with a curable polymeric liquid or sealant, such as Plastic Dip. The polymer liquid is cured or otherwise hardened into an insulating coating on the entire anode and cathode lead assembly above the Teflon or UHMW cube. Next they are outfitted with Teflon or UHMWP Plastic exterior electrode insulation cover assembly pieces to further reduce thermodynamic loss from exposure of the electrodes while operating in the aqueous fluid environment inside the generator housing, which brings about additional thermodynamic insulatory value to the reactors, increasing the efficiency of decomposition to an additional degree above where the reactors perform without these Teflon assembly pieces.

These one or more reactors decompose the aqueous solution as the heart of the system. The vaporous gas having hydrogen, oxygen, trace amounts of soluble constituents in the aqueous solution such as Sodium Hydroxide or other electrolytic catalyst addition, and aqueous solution vapor is then transported from the generator housing under pressure with the use of a 1.09 CFM, 100 LB PSI pressure capacity compressor pump. The pressure pushes the vapor materials into connection lines from the generator housing to a scrubber assembly. The scrubber assembly is designed to force the gas vapor materials through a stainless steel tube to the bottom of the scrubber housing out through a perforated end cap. This scrubber housing is filled half to the top with aqueous solution from an aqueous reservoir tank that holds 6 gallons of aqueous solution, and which has been diluted with an approximate amount of catalyst to render the aqueous solution into an electrolyte, for example Sodium Hydroxide, to bring about a certain desired level of amperage delivered to the reactors. This desired level of added constituents to the aqueous solution such as Sodium Hydroxide is determined by the drivers logging a pre HOD mpg data set, and then following the same prescribed method writing down a real time current mpg data set. Once there is an established decrease in fossil fuel usage, that amount of catalyst and the timing of when it is refilled in the aqueous solution reservoir, are together noted as the proper value of Sodium Hydroxide per amount of prescribed filtered water, and that is then used accordingly as the permanent setting.

The system may also have comprise an automated balancing component, which uses sensors to detect the concentration of sodium hydroxide (or other base, acid, or salt) in the aqueous solution and automatically adds water or sodium hydroxide to the prescribed amount, or signals a user to add the appropriate materials (e.g. via a display in the hood or the cabin). This value of Sodium Hydroxide to water lowers over time as the reactors decompose the aqueous solution. Some of the Sodium Hydroxide leaches out of the aqueous solution in the Skin of the bubbles which form in the aqueous solution between the reactor plates. That bubble then transports small trace amounts of the Sodium Hydroxide in the vapor materials to the scrubber. As the gas vapor is released from the end cap of the transportation tube, the bubbles travel upward in the aqueous solution through a baffle arrangement in the scrubber design, the first baffle is a perforated (not solid) baffle plate. The original bubbles are broken down from the larger size first release from the end cap of the transportation tube, into smaller bubbles as they travel through the plate perforations. Next the vapor gas continues in a back-and-forth fashion following a series of slanted solid baffles, through the water, giving time to reach equilibrium with the surrounding scrubber tank aqueous solution. During this equalization trace amounts of the Sodium Hydroxide leaches back into the scrubber tank aqueous solution and also the vapor materials cools down dropping off some of the loose vapor into the scrubber fluid.

The vapor gas continues moving out of the scrubber and then enters into a connection line, which transports the gas to a Venturi of the vehicle engine's intake manifold near the plenum. The connection line is attached to the top of the Venturi or a Vortex tube or a Venturi valve (for example, where there is a Vortex tube instead, or a Venturi valve from an EGR system connection). The vapor gas is delivered into the front of the Venturi prior to the compression stage so that the vapor gas is compressed and mixed with the incoming air stream. At the back of the Venturi, the mixture of gas vapor and air is uncompressed immediately so that the vapor gas is thoroughly saturated into the air stream. As a result, all combustion chambers receive substantially the same or similar amounts of the hydrogen/oxygen vapor molecules to produce a similar significant combustion catalytic occurrence which improves efficiency and lowers the fossil fuel usage and emissions. In this method of delivery, the gas vapor is assured of consistent delivery to each cylinder, contrary to conventional methods, which do not use this type of saturation technique to allow for sufficient consistency to all cylinders equally. That is to say, without the use of the Venturi effect the gas vapor may follow a single pathway in the air stream, reaching only one or a few cylinders, causing a unbalanced combustion effect.

FIG. 1 illustrates an exemplary hydrogen generation and delivery system 100 according to an embodiment of the present disclosure. In an embodiment, the system includes six (6) main core sub-systems: (i) a reactor system 102, (ii) a generator housing 104, (iii) a power management system 106, (iv) an aqueous solution control system 108, (v) an air intake and delivery system 110, (vi) and a pressure & safety switch system 112. The reactor system 102 is in charge of producing hydrogen and oxygen gas through electrolysis of an aqueous electrolyte. The generator housing 104 protects the reactor system 102 and provides a plurality of inputs and outputs for power supply, water control, and delivery of gas produced by the electrolysis. The power management system 106 controls the voltage and amperage applied to the generator housing and other electrical components of the system such as pressure sensor, solenoid switch, vacuum pump, and water pump. The aqueous solution control system 108 manages the supply and circulation of solutions in and out of the generator housing 104 and the reactor system 102. The air intake and delivery system 110 supplies the generated hydrogen and oxygen gas to an engine. The pressure & safety switch system 112 includes a plurality of pressure sensors and safety switches to regulate the gas and solution circulation in the system. The system may optionally have a system box 120 that has all of the subsystems installed inside so that the system. For example, the system in the system box 120 or cabinet can be provided easily installed ready-to-use product, for instance, as a retrofit for an engine, generator, or similar energy source.

The system may be used as a sophisticated, efficient, durable, and adjustable mobile hydrogen/oxygen on-demand (HOD) gas delivery system. The system in general uses electrolysis to decompose water into it's core molecules of hydrogen and oxygen, in the form of nascent gas combined with trace amount of warm aqueous vapor solution with any trace amounts of catalyst used in the aqueous solution, then transports this vapor gas to a Venturi (or similar device i.e. Vortex) which is attached in-line with a vehicles air intake plenum or manifold, and which causes a saturation of said vapor gas into the incoming air stream, and then this newly enriched combination of nascent hydrogen/oxygen and air continues into each combustion chamber of the motor where it mixes with the diesel (or any fossil fuel material), forming a new high-octane combustible mixture whereby the combustion efficiency is increased, therefore causing the engine to perform in a more efficient manor, displaying lower exhaust excrements to be excreted after combustion occurs, and therefore lowering fossil fuel requirements during motor operation.

The system may use various types of power sources, including a vehicle battery, a 110 V wall outlet, a vehicle's alternator, or any batteries that produce several volts voltage. In a preferred embodiment, when the system is used in a vehicle, the vehicle's battery is used as the power source. In another embodiment, a 110 V wall outlet is used as the power source when the system is used as a over-the-counter system.

Figure 2A:
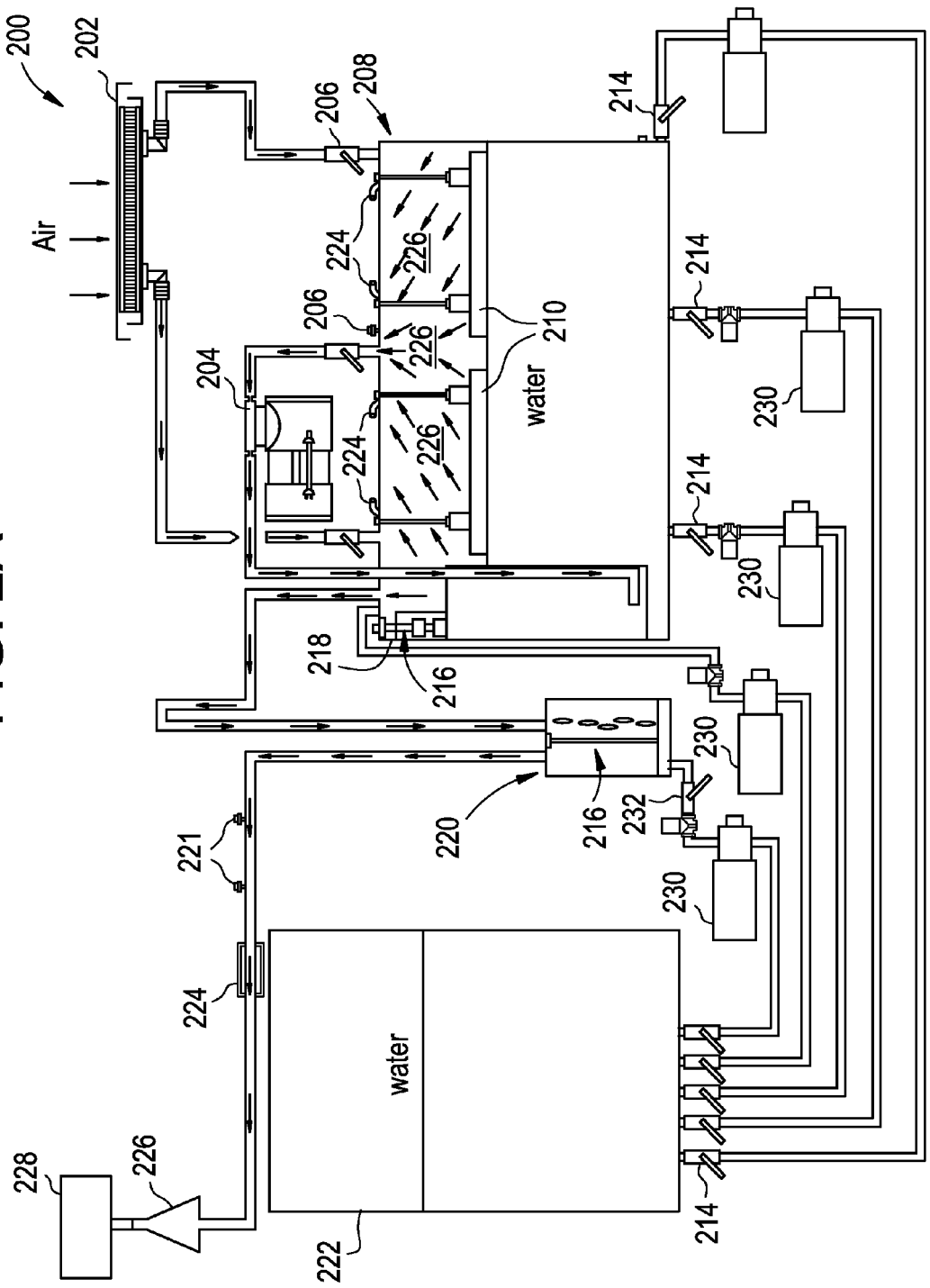

FIGS. 2a and 2b illustrates an exemplary implementations of the system described in FIG. 1. The system 200 includes a water tank 222 that provides water to the two cells 210 encased by me housing 208 through valves 214 by the assistance of one or more water pumps 230. The cells 210 are energized by a battery through the connectors under the control of a power management system. The cells 210 are submerged in an aqueous sodium hydroxide solution so that electrolysis occurs. The hydrogen and oxygen gas 226 generated by the electrolysis is mixed with the air filtered through an air filter 202, 911.

In one embodiment, as shown in FIG. 2A, a compressor/vacuum pump 204 produces a negative pressure that sucks in the mixture of the gas and the air and sends the mixture through a scrubber 218. The air pump 204 is configured to be used as a vacuum pump 204 drawing the as vapor from the generator house 208, putting the generator house 208 under a vacuum as well as the air intake under a vacuum, and then pushing the gas vapor to the scrubber 218. In another embodiment, shown in FIG. 2b, the intake side of an air compressor draws clean air from an air intake tube 232 and to push the air into the generator house 208 on either side of the generator top 209 and exhaust it out of from the middle of the generator house 208 to the scrubber 218. As will be noted, the embodiment shown in FIG. 2b does not use any of the inline ball valves as shown in the embodiment of FIG. 2a.

A float switch 216 is installed in the scrubber 218 to regulate the solution level in the generator housing 208. The mixture further passes through one or more pressure switches 221 and a check valve 224 and enter a Venturi 226 connected with the engine 228 so that the mixture is used by the engine. In the embodiment shown in FIG. 2a, the mixture further passes through a safety water lock 220 that allows cooled water vapor to condense, however the water lock is not used in the embodiment shown in FIG. 2b.

Figure 3A:
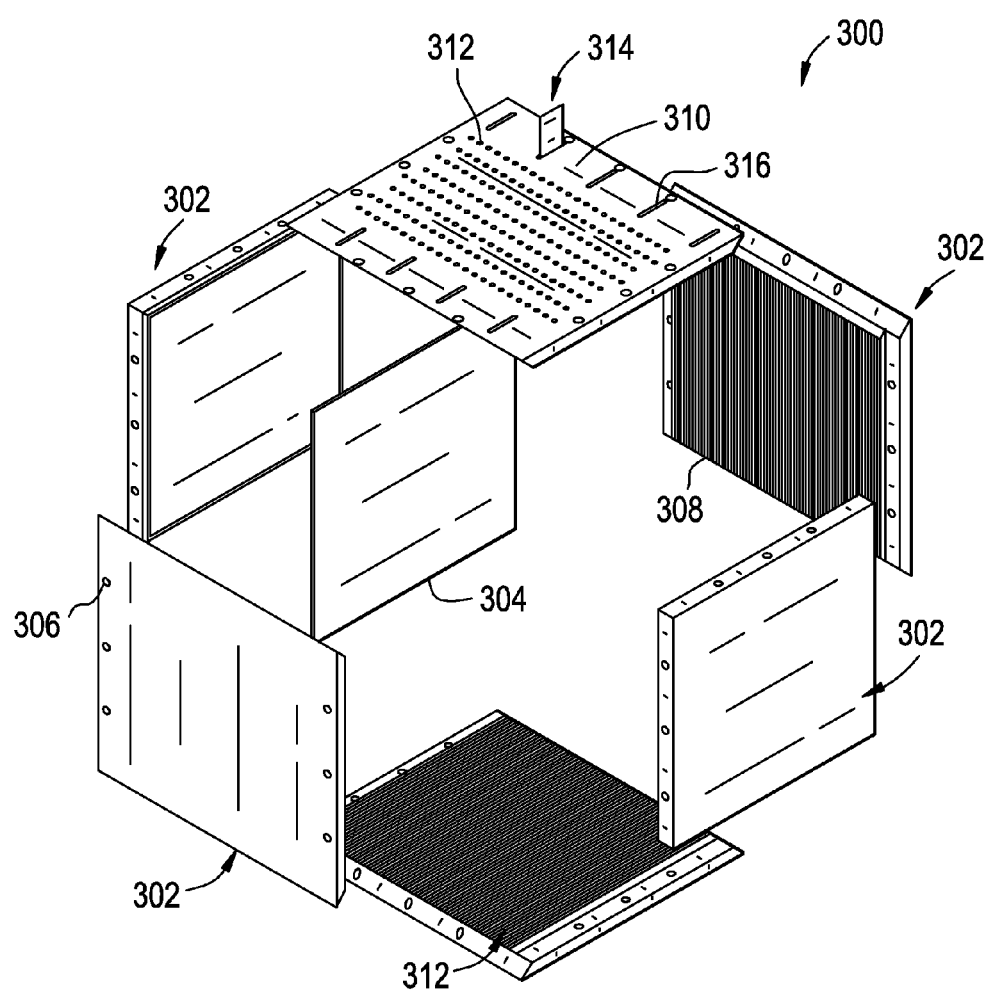
FIG. 3A illustrates an example of the electrolysis reactors according to an embodiment of the present disclosure.

FIGS. 3a-3b shows at example of the electrolysis reactors 300. The reactor 300 includes Teflon walls 302, stainless steel or other conductive alloy plates 304 and Stainless Steel screws 306. The reactor 300 requires no glues or adhesives to assist in bounding or scaling. The reactor 300 is submersed in aqueous solution filtered in a certain prescribed method, and of which have stainless steel (or other similar conductive materials i.e. Titanium, Nichol 200, Carbon Alloy or any other similarly conductive material, as well as including a range of conducting ceramics such as indium tin oxide (ITO), lanthanum-doped strontium titanate (SLI), yttrium-doped strontium titanate (SYT), and carbon fiber conductive materials and the like) plates inside a Teflon or UHMW plastic cube, and of which these plates are energized with electricity from a vehicles battery set, utilizing a vehicles' 12 volt system's current and amperage to electrify the aforementioned stainless steel plates (can alternatively be any conductive materials like stainless steel, or Nichol 200, or Titanium, or other conductive materials like carbons or composites which conduct similarly to stainless steel) which depending on the design usage may vary. These plate are housed inside the aforementioned Teflon or UHMW cube made of six (6) walls and are milled to specific reengineering tolerances to hold the plates in grooves/slots 308, and then six (6) of these Teflon walls are combined into a cube (can be any shape as long as the grooves and manor of insulating the plates conforms to write up herein) fashion, thus completely surrounding the plates, which fit into grooves/slots 308 engineered to specific tolerances, to hold these plates in place, and to completely, hermetically surround each plate, isolating each plate from an adjacent plate, thus insulating each plate from one another, reducing any chance of shorting or shunting of current from plate to plate. Furthermore, by isolating the plates in the method, the reaction in elation decreases the amount of electrical energy necessary to cause decomposing of the aqueous solution into its core molecules of hydrogen and oxygen.

Figure 3C:
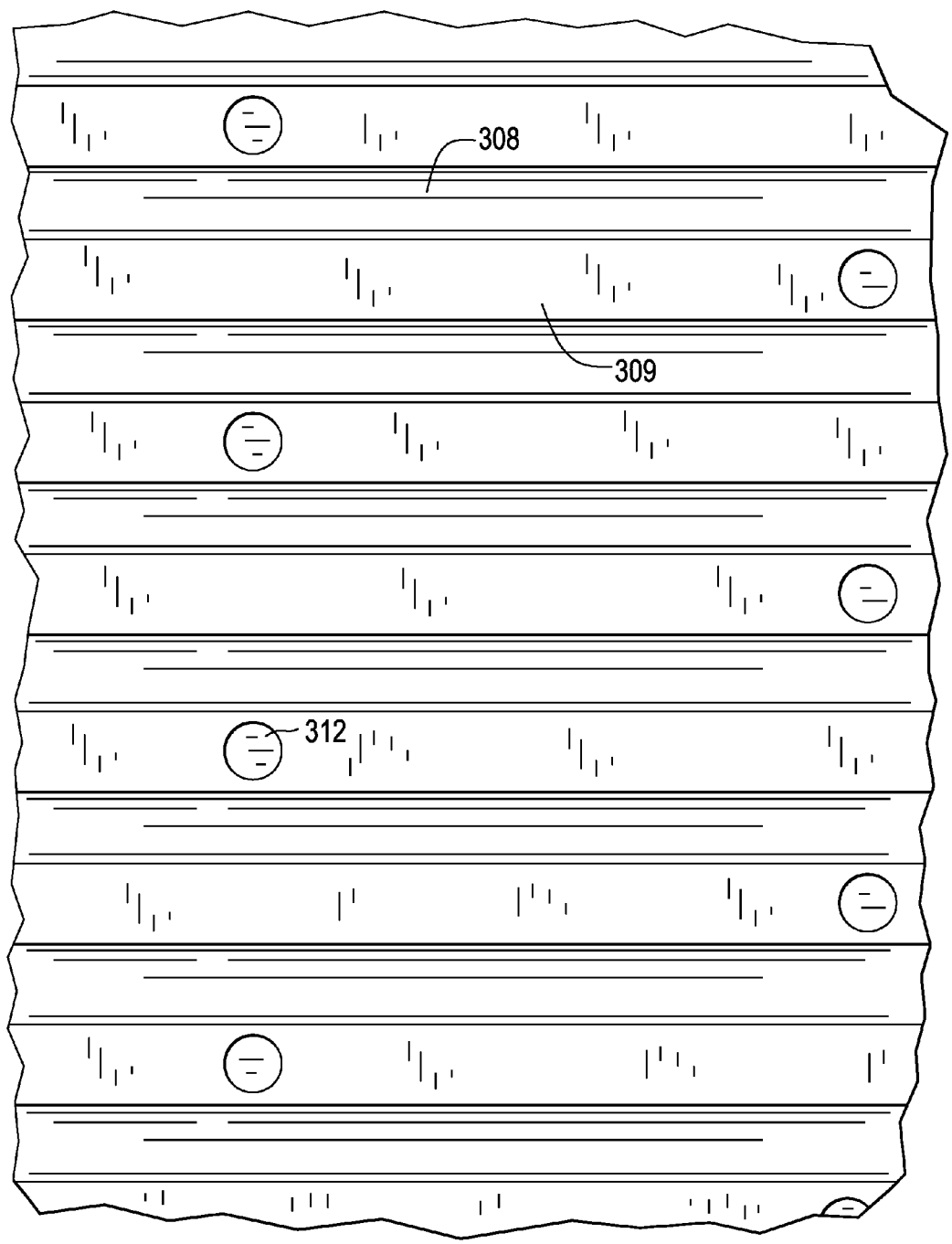
FIG. 3C illustrates an insulator/separator.

Between each plate inserted into the grooves 308 of the Teflon or UHMWP walls, is Teflon or UHMW insulator/separator 309. As shown in FIG. 3C the insulator/separator 309 is formed by protrusions 309 formed between the grooves 308 formed in the insulator/separator wall. In a preferred embodiment, the insulator/separator 309 is the protrusions 309 of the grooves 308, which naturally separate the anodes and cathodes.

These grooves 308 are located on the bottom, top and two (2) side walls, and each is milled an exact tolerance corresponding to the plates. On the top and bottom walls there are small openings 312, shown as holes milled to a specific tolerance of diameter and which are located only in the insulator/separators between the inserted reactor plates, thus protruding upward or downward depending orientation, and depending on whether the top of the bottom are referenced.

These openings 312 on the bottom are specifically for induction of water upward into the area between plates, and specifically oriented between the stainless steel plate in the insulator/separators to eliminate any possible occurrence of electrical shorting and shunting which occurs from bare edge to bare edge of the reactor (steel or other conductive material) plates in the event the plate edges are not completely embedded in a polymeric material which insulates electrical passage when submersed in an aqueous solution. The openings 312 in the top UHMW plastic or Teflon wall are specifically placed to function as an exhaust port for the hydrogen/oxygen and vapor molecules to be released, and for non-decomposed aqueous solution to rise up through the reactor plates, and then cycle back around die edges of the plates in a Torus effect around the cube, shown in FIG. 3b.

As shown in FIG. 3b, this water cycling in a circular pattern through the cube and then around its edges and back into the bottom of the cube, forming a torus like pattern. This reactor torus causes additional thermodynamic diffusion and dissipation of heat build up within and without the cube, allowing the interior cube water, and exterior cube water thermodynamic equilibrium for a more controlled and maintained temperature. This equilibrium is important in reducing possible amperage increasing which tends to occur in electrolysis over time with reactors that are not insulated completely and which don't have surrounding water circulating through the reactor and around it on a consistent basis which disseminates the heat property.

Figure 4C:
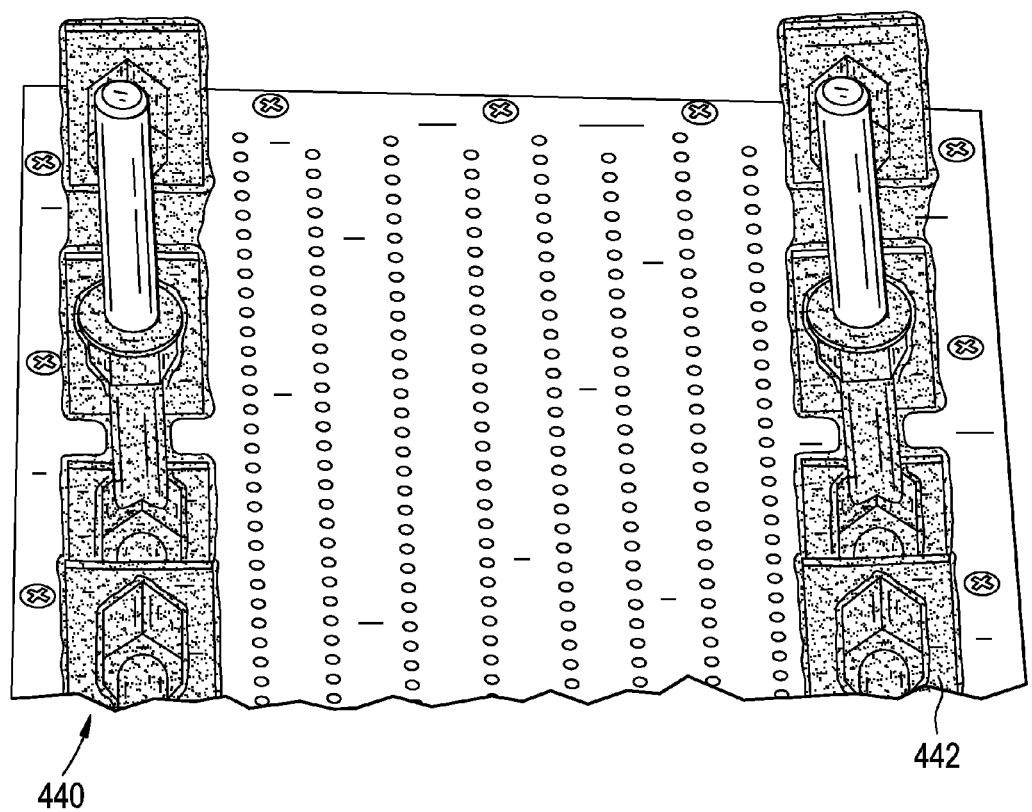
FIG. 4C illustrates an insulated anode and cathode assembly.
Figure 5:
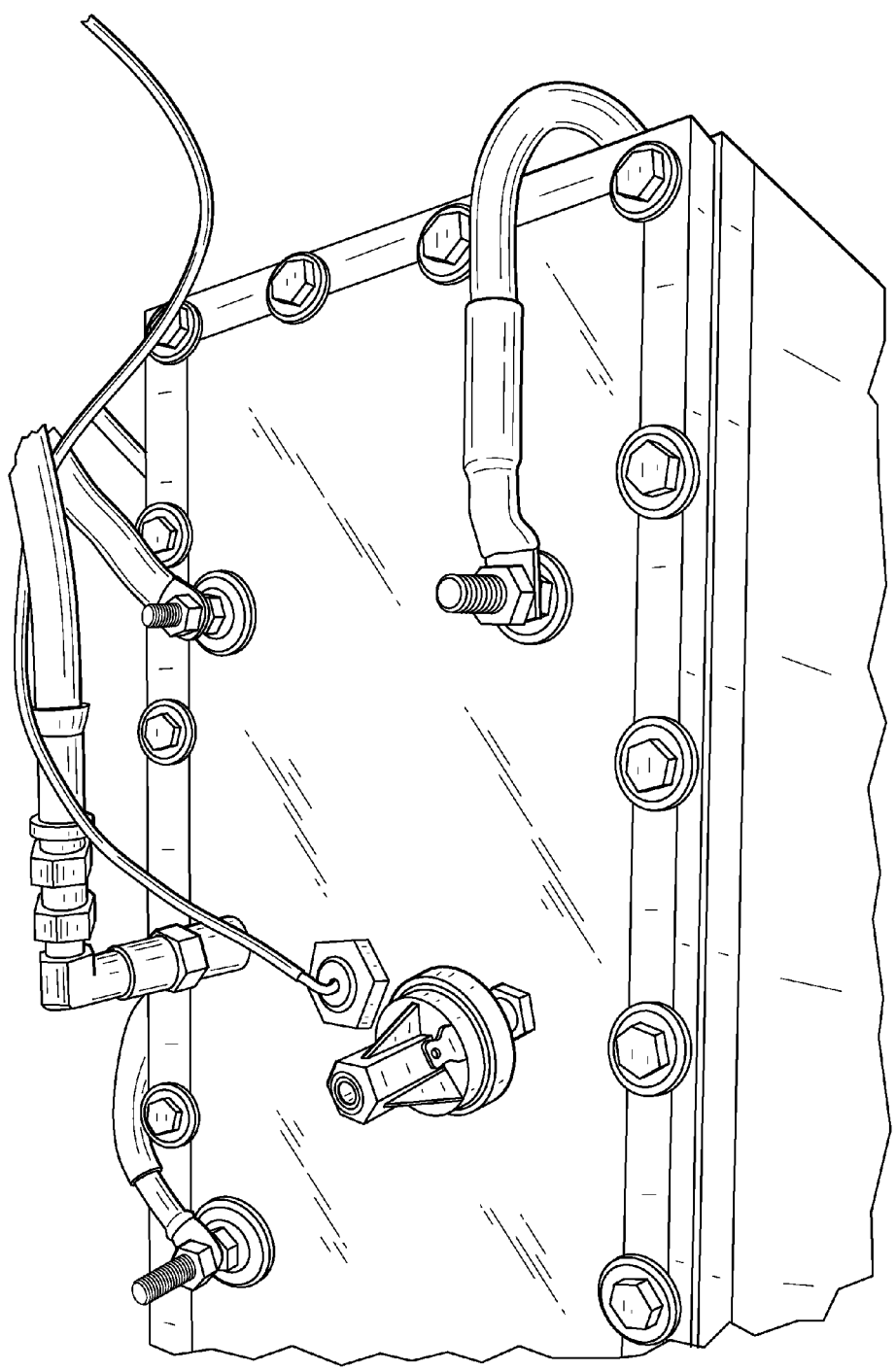
FIG. 5 illustrates a partial generator housing according to an embodiment of the present disclosure.

The cube holds one or more cathode/anode pairs. A minimum of one pair is acceptable, but a plurality can be used, for example 5. In an embodiment an arrangement comprises 6 neutrals and then a cathode or cathode/neutral/anode in arrangement. This sequence can repeat 8 times to complete the cube slotted interior. The cube interior therefore can comprise 57 slots and houses 5 cathodes, 4 anodes, and 48 neutrals, According to an embodiment, the plate arrangement contains five (5) cathodes 404a, 404b, 404c, and 404d and four (4) anodes 402a, 402b, 402c, and 402d, as shown in FIG. 4a. Note that each anode and cathode has similar shape and dimension. All anodes and cathodes are 16 gauges in thickness but can vary and achieve similar results in decomposition of the aqueous solution. Each anode and cathode protrudes out of the top wall 424 made of the Teflon or UHWM. The configuration is such that the outside plates 314 in FIG. 3 are anodes with alternating cathodes between, specifically, alternating each anode with a cathode and then anode again. Between each anode and cathode are neutral plates which do not protrude out of the top Teflon wall 424, and do not touch either anode or cathode. As shown in FIG. 3a the anodes and cathodes protrude out of the top Teflon or UHMW wall through milled openings 316 cut to the size of the anode and cathode lead.

The anode and cathode leads are then connected together by a conductive bolts 406 or 416, which can be any conductive materials such as stainless steel or which have similar conductivity to the stainless steel, for example Nichol 200, Titanium, and Carbon etc. The bolts 406 and 416 penetrate through each lead and are anchored on either side of the lead with conductive nuts 410a, 410b, 412a, and 412b (e.g. stainless steel), which in turn are welded in place once securely tightened against the lead.

The anodes are all attached to each other with this bolt assembly method, and the cathodes are all attached to each other with the same bolt assembly method, however, the anodes and cathodes bolt assemblies are not directly attached to each other. The anode and cathode assembly is then insulated, for example by being completely covered with a Plasti Dip coating, shown as 440 and 442 in FIG. 4c. This provides insulation from to aqueous solution while simultaneously insulating the electricity traveling interiorly through the bolts to aid in cutting down on thermal losses.

As shown in FIG. 4a on either or both the anode or cathode bolt attachment assembly, there is another stainless steel bolt 414, 422 which is attached in the center of the bolt attachment assembly and rises upward toward the roof of the generator housing in which the reactor cubes reside. These two bolts 414, 422 pass through a Teflon or UHMWP roof of the generator housing and are affixed into place, mounted by seals and nuts 418, 420 on either the interior side of the generator housing roof or the exterior side. These two (2) bolts are the leads for connection which transports the electrical energy to the reactors inside the generator housing.

The generator housing encloses the electrolysis reactors, which are suspended in the aqueous solution in the housing. The reactor cubes have electrodes (cathode and anode) as extruded from the top Teflon or UHMWP wall, as described above, and attach to a power supply. This electricity energizes the anodes and cathodes creating a field on the anode and cathode plates which emits over the neutral plates which are between each anode and cathode, and which causes the decomposition of water through this process, into hydrogen and oxygen.

According to an embodiment, as shown in FIG. 4b, the reactor unit further includes an anode and cathode cover assembly 426, 428 between the top of the Teflon or UHWM plastic cube and the roof of the generator housing (not shown) is the anode and cathode assembly. The anode and cathode bolt assembly 426 or 428 is covered with a specifically milled dielectric or insulator material as described herein, for example UHWM plastic, Teflon or any polymeric or dielectric materials with similar dielectric constants as the Teflon, i.e. Teflon derivatives, as well as other polymers, ceramics, or other materials with insulator capability. In an embodiment, the insulator material is also resistant to sodium hydroxide or other catalysts used in an electrolyte. Cover assemblies 426, 428 insulate the anode and cathode assemblies from the surrounding water or circulation air and gas vapor. As a result, the cover assemblies 426 and 428 improve the thermodynamic efficiency and prevents electrical breakdown. Specifically, at high amperage values, the cover assemblies 426 and 428 stop electrical shorting from the anodes and cathodes to other metallic structures, i.e. the stainless steel walls of the generator house, and stop the possible occurrence of electrical branching into the water causing loss of thermodynamic energy. This assembly further insulates the anode and cathode assembly causing additional reducing of electrolytic catalyst in the aqueous solution, yet allowing faster and better decomposition of the aqueous solution at lower electrical values. This improved insulation method allows for more accurate settings for decomposition adjustments. This additional insulation on the anodes and cathodes brings about more efficiency in water composition, as for example where dielectric insulation material is used.

According to an embodiment, generator housing is provided to enclose the reactor. According to an embodiment, the generator housing includes two (2) reactor cubes in an aqueous solution, whereby the two (2) reactors are separated by a stainless steel reactor separator wall. The reactor cubes are suspended in a stainless steel (can be a polymeric material or heavy duty stainless steel which resists corrosion from sodium hydroxide and aqueous solution combinations) frame basket by a specific distance from the bottom of the generator housing floor, and a specific distance from the top of the generator housing. These distances allow for a circulation of the aqueous solution around the reactors, both below them and above them. Between the reactors, the stainless steel separator wall has a rectangular notch cut out of the top and bottom of the wall, allowing for the aqueous solution to circulate between reactors through the bottom notch and for water and gaseous decomposed hydrogen and oxygen vapor to circulate above the aqueous solution in the top portion of the generator housing.

Figure 6:
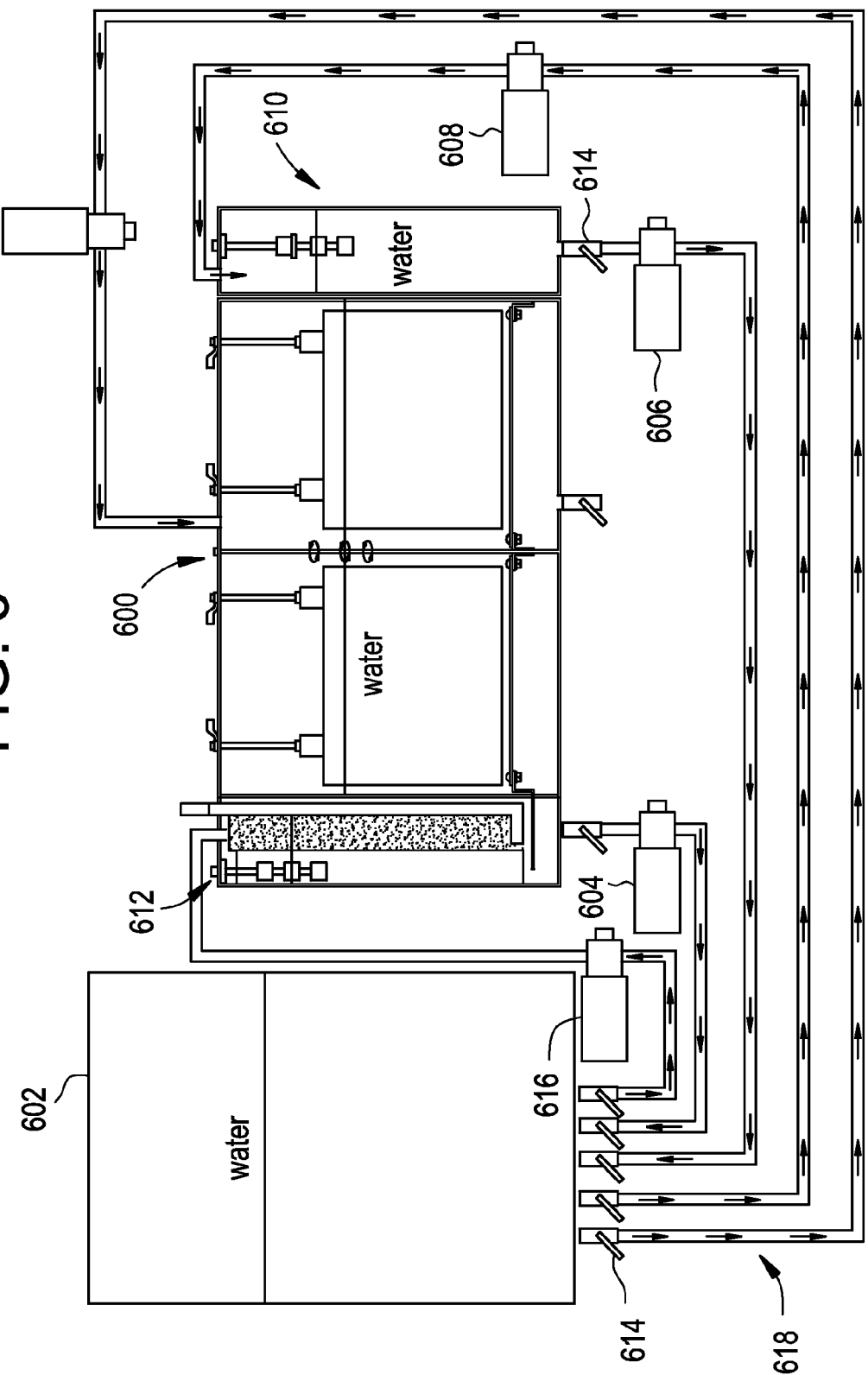
FIG. 6 illustrates a water regulation system according to an embodiment of the present disclosure.
Figure 7:
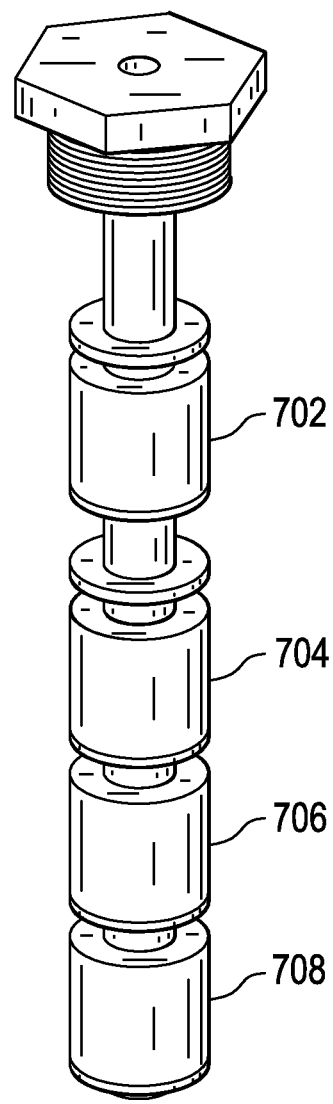
FIG. 7 illustrates a float switch according to an embodiment of the present disclosure.

According to an embodiment, a liquid regulation float switch 600 is used between the two reactor units as shown in FIG. 6. The roof of the generator housing includes a slot milled to the specification of the float switch 600 so that the float switch 600 is inserted into the generator housing. An enlarged view of the float switch is shown in FIG. 7. This switch is manufactured to specific tolerances as required the system needs. There are four (4) floats (702, 704, 706, and 708) with magnetic switch triggers. The bottom float switch 708 is a termination safety switch which shuts down the entire system if it is unmade. This protects the reactors from running dry in the event there is a failure in the aqueous delivery, which in turn protects the reactors from being energized without aqueous solution present. This insures the safety of the reactors, which may draw addition amounts of energy without aqueous solution present, and in turn may melt and damage the walls, and in worst case may cause combustion of the polymeric materials if shorting occurs. The two middle floats switches 704 and 706 regulate the level of the aqueous solution in the generator housing to a prescribed amount and level which is pursuant to optimal decomposition of the aqueous solution by the reactors. The top float switch 702 is a termination safety switch which causes the entire system to shut down in the event it is unmade. This safety protects against any aqueous materials being sent to the next stage scrubber causing an endless loop in the aqueous material pumps system, and regulation.

These four float switches are individually wired and connected to dedicated relay switches that control the power of the system or the water pump. According to an embodiment, the two middle float switches 704 and 706 are connected to relays that control the water pump. Comparing with the traditional method of controlling water pumps with only one switch, using two middle float switches 704 and 706 to control water pumps can prevent a rapid on and off of water pumps. The top float switch 702 and the bottom float switch 708 are connected to a system level relay so that the power of the entire system is affected by the made or unmade mode of these two float switches.

Another embodiment of the aqueous supply system is shown at FIG. 2b, where 3 (3) water pumps 230a, 230b, 230c are employed. As shown therein, a water pump 230a adds aqueous solution from the water tank 222 to the generator 208, another water pump adds the aqueous solution to the scrubber 218, and a third water pump 230c draws liquid from the scrubber 218 for cycling each time the vehicle is turn off and back on.

Figure 18:
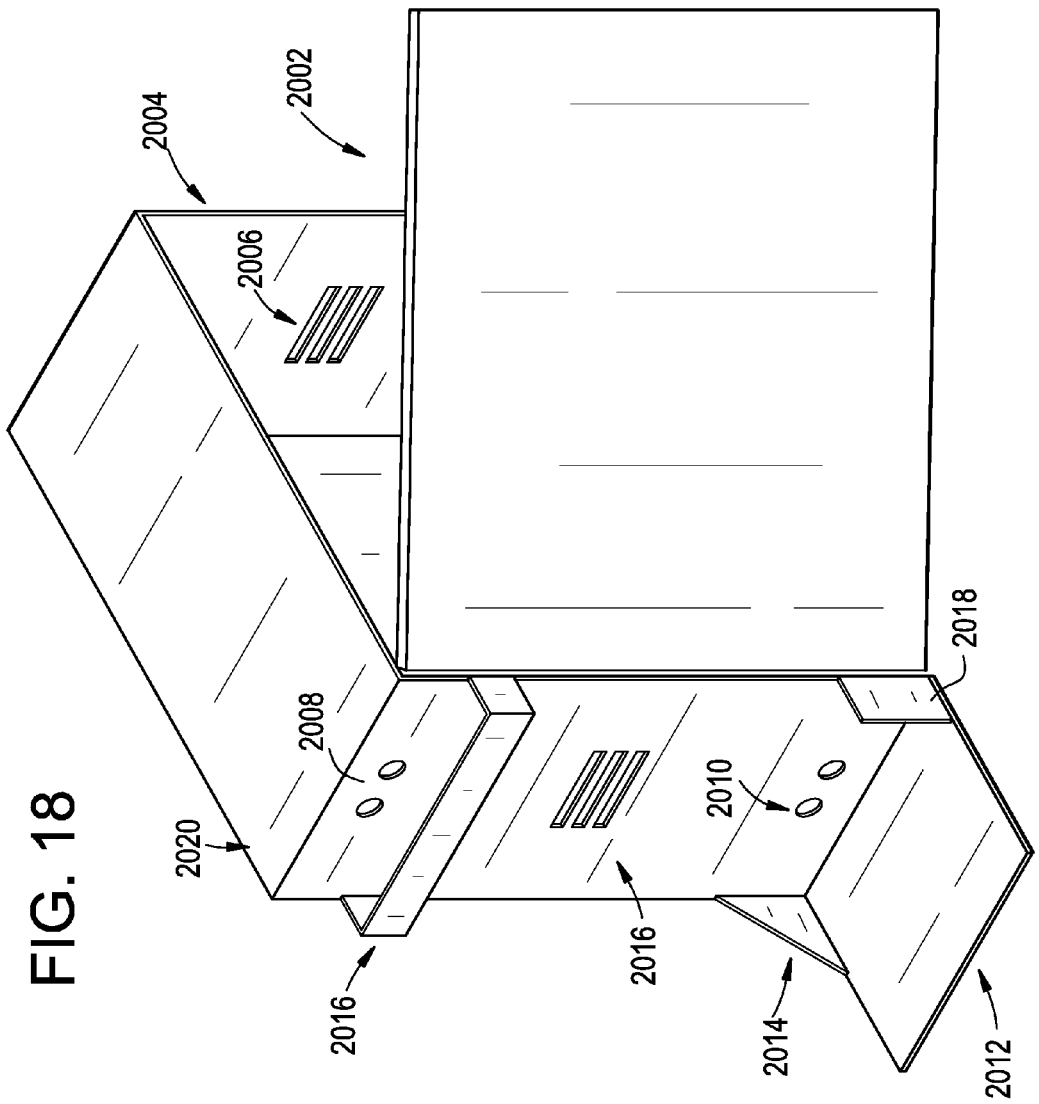
FIG. 18 illustrates a system box according to an embodiment of the present disclosure.

According to an embodiment, a drain valve 1802 may be installed at the bottom of the generator housing, as shown in FIG. 18. For example, a stainless steel ½ ball valve may be used for the easy draining of the system generator housing.

Figure 8:
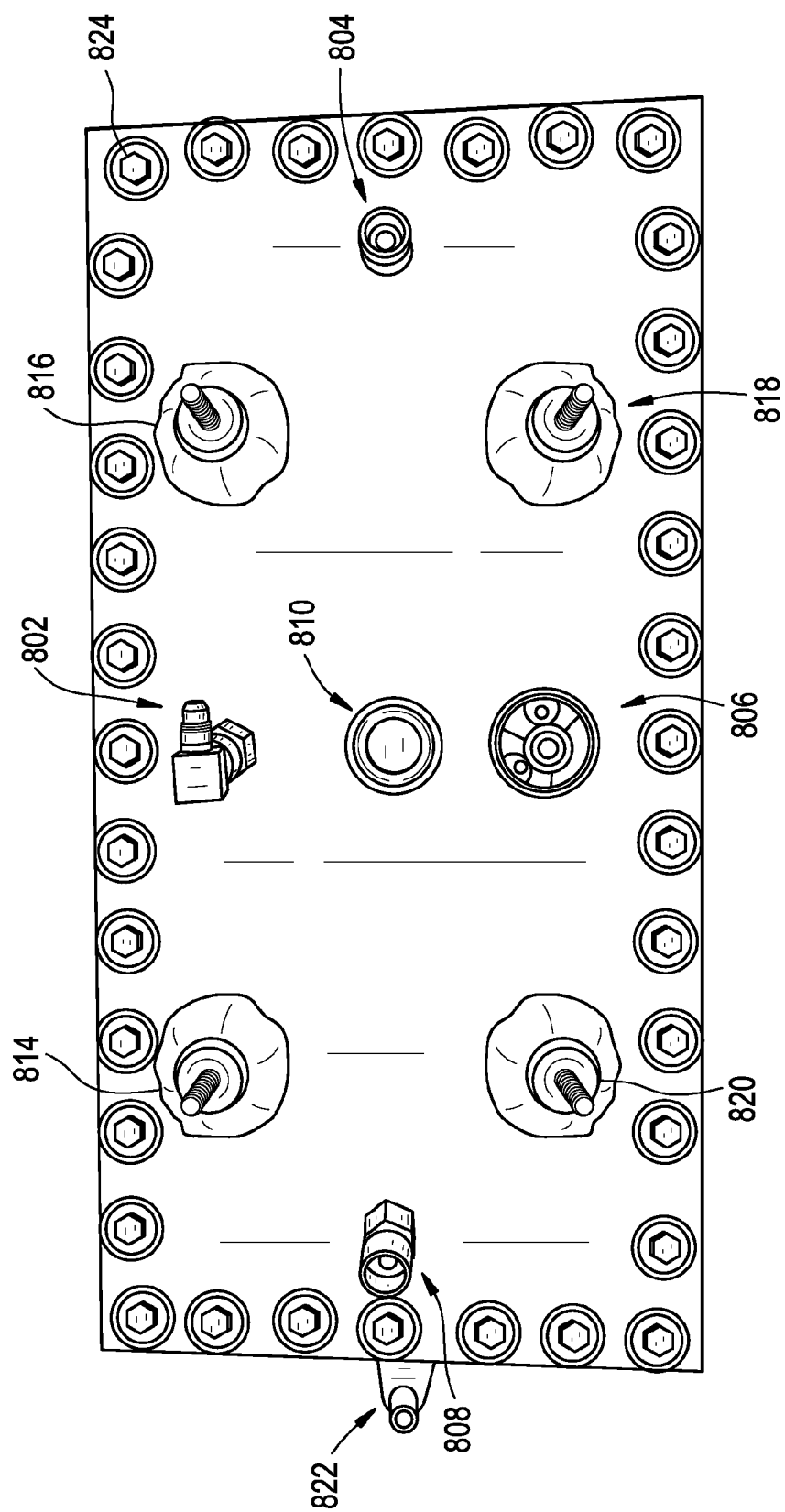
FIG. 8 illustrates a top view of the generator housing according to an embodiment of the present disclosure.
Figure 9:
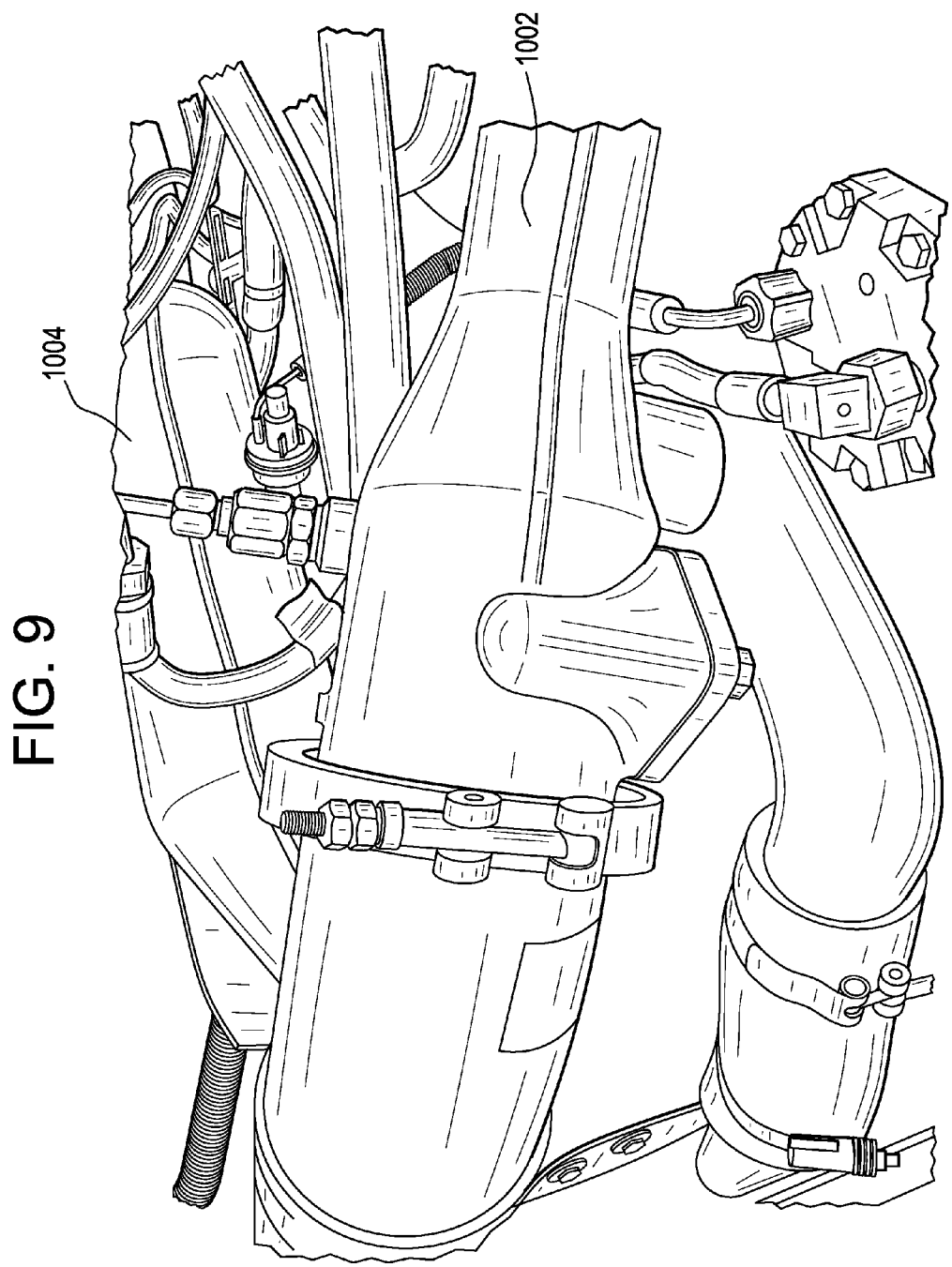
FIG. 9 illustrates a gas input to the Venturi of the engine according to an embodiment of the present disclosure.

According to an embodiment, the generator housing may have a plurality of openings in the top plate as shown in FIG. 8. For example, the top plate may have five (5) holes or slots (802, 804, 806, 808, and 810) in addition to the four (4) holes or slots (814, 816, 818, and 820) allocated to the anodes and cathodes for the two (2) reactors, and these holes are specifically drilled and assembled with compression fittings pursuant to each fittings needs. There are two (2) holes on either end of the generator house top which have two stainless steel one way check valves. Attached to those check valves are compression fittings connected to high pressure stainless steel mesh gas lines (804 and 808). These two (2) lines are specifically for the intake of high pressure air. The air circulates with the hydrogen and oxygen gases and then exits a fitting hole 802 in the middle of the generator top, towards the back. Attached to this exhaust air fitting 802 is another high pressure stainless steel mesh wrapped line for transporting the air and gas mixture to the scrubber. Directly in front of the exhaust one way check valve is the hole for the float switch assembly (810), drilled large enough to allow the easy removal and replacement of the float switch. Directly in front of the float switch in the generator top is a hole for the High Pressure valve (806), which monitors pressure at a certain prescribed value, winch protects the system generator house from building too much pressure. In the event the pressure climbs higher than the safe setting pursuant to system design, than the system terminates. On the left side of the generator housing is a final elbow 822, stainless steel connector, where the aqueous solution is filled from.

The generator housing is pressure sealed and tested at 50 lbs PSI. There are thirty six (36) stainless steel bolts (824) around the circumference of the top wall, tightened to a prescribed tolerance, with stainless steel washers an rubber grommets, and with a single piece gasket between the top lid and the specifically engineered mounting lip in the interior of the generator house.

The following table provides a list of non-limiting exemplary parts, interconnections, functions, or other notes that are used for the above-described generator housing and reactor cubes. As will be appreciated, the listing of parts, interconnections, and functions are examples, and other comparable parts and/or interconnections as are known within the art are within the scope of the present invention can also be used and hence are not listed here.

| Part | Interconnection(s) | Function(s) or Note |
|---|---|---|
| Anode Plates 16 gauge 304 SS × 4 | Inserted into slots in Teflon walls and cube and generate a positive energy field to release oxygen | Final energy dispenser for positive electrical energy which generates a field around the anode plate to over-lap with the negative energy field emitted from the cathode |
| Cathode Plates 16 gauge 304 SS × 5 | Inserted into slots in Teflon walls and cube and generate a negative energy field to release hydrogen | Final energy dispenser for negative electrical energy which generates a field around the cathode plate to over-lap with the positive energy field emitted from the anode |
| Neutral Plates 16 gauge 304 SS × 48 | Inserted into slots in Teflon walls between each anode and cathode | Magnifier of energy field emitted by the anodes and the cathodes |
| UHMW Plastic Side Walls ½ × 2 | Connect to the Top and Bottom Teflon walls | Slotted to a prescribed depth and width for the anodes, cathodes, and neutral plates to fit into |
| UHMW Plastic ½ Top & Bottom Walls × 2 | Rest on top of the 2 side walls | Engineered with specific sized & critically milled holes located between the plate separators |
| UHMW Plastic ½ end walls × 2 | Connect at either end of the 4 Teflon walls | The end walls to support the UHMW plastic side walls and UHMW plastic ½ top and bottom walls. |
| Stainless Steel Sheet Metal Screws Flat Phillips #8 × 1.25" × 44 | Inserted into each side, top & bottom and end walls to hold the entire cub together | Connective bolts to hold the entire cube together. Glues or adhesives are not required or optional. |
| Cathode Connection Bolts SS ⅜ Bolt × 6.75" | Connects the Cathode leads together with nuts on either side of the lead | The nuts are TIG welded in place once tightened against the lead |
| Anode Connecting Bolt SS ⅜ Bolt × 5.5" | Connects the 4 anode lead together with nuts clamping in on either side of the lead | The nuts are TIG welded in place once tightened against the lead |
| ⅜" SS nuts × 20 each for anode and cathode lead locks | for anode and cathode lead locks and center lead bolt locking | These nuts lock each anode and cathode to form a tight connection for electrical passage |
| ⅜ SS Bolt × 4.5" × 2 each Top Lead Penetrating Bolts | Connects either anode and cathode upward penetrating out of the Generator Housing Teflon Top | These are the 2 leads that connect outside of the generator housing. |

-continued

| Part | Interconnection(s) | Function(s) or Note |
|---|---|---|
| Anode/Cathode Lead Penetrating Bolt 3/8" SS Top Locking Nut × 2 | Anode and Cathode Locking nuts TIG welded with SS Washer where Teflon Top will rest against | Stop the Teflon Top from bowing downward |
| Anode/Cathode Lead Penetrating 3/8" SS Washer × 2 | Anode and Cathode Locking nuts TIG welded with SS Washer where Teflon Top will rest against | Stop the Teflon Top from bowing downward |
| Red Plasti Dip × 4 oz | Cover the anode assembly including cross bolt, leads and Top Penetrating Bolt | Insulating coating to protect the anode and cathode assembly while reducing the loss of thermal energy |
| Black Plasti Dip × 4 oz | Cover the cathode assembly including cross bolt, leads and Top Penetrating Bolt | Insulating coating to protect the anode and cathode assembly while reducing the loss of thermal energy |
| UHMW Plastic Anode Covers 6" × 3/4" × 2.5" × 2 | Connect on either side of the anode assembly | Completely insulate the Anode assembly from any possible shunting and holds in thermal energy from loss |
| UHMW Plastic Cathode Covers 6" × 3/4" × 2.5" × 2 | Connect on either side of the cathode assembly | Completely insulate the Cathode assembly from any possible shunting and holds in thermal energy from loss |
| Assembly Screws Sheet Metal Flat Phillips Head SS #8 Screws × 1.25" × 8 | Hold Teflon Anode and Cathode Covers together 4 for each assembly | |
| Lock Down Sheet Metal Flat Phillips Head SS #8 Screws × 2.5" × 4 each on Cathode | Lock the Teflon Cathode Cover Assembly down to the Teflon CUBE | Secure the Teflon cathode Cover Assembly from moving away from the Teflon Cube. |
| Lock Down Sheet Metal Flat Phillips Head SS #8 Screws × 2.5" × 2 each on Anode | Lock down the Teflon Anode Cover Assembly to the Teflon Cube | Secure the Teflon Anode Cover Assembly from moving away from the Teflon Cube |
| Teflon Cube Basket SS 16 gauge × 2 | Connect to the SS generator housing walls to support the Teflon reactors | Connect with SS bolt to 90% SS bracket welded to generator walls (Middle wall and Side wall) |
| 1/4" Thick × 3/4" Long SS Reactor Basket Connecting Bolt × 4 | Connect the reactor brackets to the 90% Support Brackets | |
| 1/2 × 7 1/8" 90% SS Angle Brackets | Welded to the either side wall of the generator house and welded to the middle support wall | These brackets are TIG welded into place to secure the system. |
| 16 Gauge 304 SS Middle Support Wall 8 3/8 Wide × 9.5" Tall with Cut Outs in middle × 1 | Weld connected in the middle of the | There are cut outs at top and bottom. The top cut out is 2' × 5" for gas circulation and the bottom has 2 cut outs 1" × 1" each for water circulation. |
| Madison Float Switch 7 1/4" Tall with 4 float switches | Connect through the Teflon top of the generator housing | Keep aqueous solution moderated and have a low and high level safety shut down |
| 3/4" Brass Ball Valve | Connected at the bottom of the Generator house for draining aqueous solution | |
| UHMW Plastic Generator Top 18" × 8.5" × 3/4" × 1 | Connect to the generator housing with 36 Bolts through the top into support brackets | |
| 1 1/4" 1/4" SS Machine Bolts × 36 | Connect the Teflon Top with the SS generator housing | The proper amount of bolts to ensure a 50 LB PSI pressure capability in the interior of the generator housing |
| 1/4" ID × 3/4" OD Flat SS Washer Lock Down Top | Connect between Lock Down Bolts and Teflon Top | |
| E 6000 Adhesive × 3.7 oz | Seal the locking Nuts and Washers | Also used for the lock down nuts on the Anodes and Cathodes Sealer. |
| Automotive Cork Gasket Material | Connect between the Teflon Top and the SS connector brackets welded to the interior walls of the generator housing | |

-continued

| Part | Interconnection(s) | Function(s) or Note |
| --- | --- | --- |
| ⅜" SS Anode Cathode Lock down Nuts × 4 | Lock down the Anode and Cathode against the Teflon Top and the interior locking nut | |
| ⅞" SS Flat Washer Anode Cathode Lock Down Washer | Lock down the Anode and Cathode against the Teflon Top and the interior locking nut | |
| ⅜" Brass Water Intake Elbow | Connect to the generator house on the left side to connect the water intake hose | |

FIG. 6 illustrates an exemplary embodiment of aqueous supply system according to an embodiment of the present disclosure.

The aqueous solution system needs to be controlled so that the Sodium Hydroxide solution is continuously decomposed into hydrogen and oxygen. The system includes a water reservoir 602 attached to the outside, residing next to the generator housing 610. According to an embodiment, this reservoir holds 6 gallons of water, which is mixed with an approximate ¾ oz to ½ oz of Sodium Hydroxide. This aqueous solution is sent to the generator house via a connected water line 618 at the bottom of the reservoir. The aqueous solution is circulated by a water pump such as a small 35 lb psi pressure water pump. Once enough aqueous solution has filled the generator house, the solenoid valve closes and the water pumps stops. The solenoid valve allows the generator house to keep a consistent pressure as provided by the vacuum/compressor pump for moving gas vapor through the system. System float switch 600 controls regulate the aqueous fluid levels in the generator housing. Two more solenoid valves and water pumps 616 and 604 control fluid levels in the scrubber housing. The pump 616 brings water into the scrubber housing when levels are low, while the other pump 604 is responsible for taking water out of the scrubber and cycling it back to the reservoir for reuse each time the vehicle is turn off and then back on. This recycling of the scrubber fluids assures the balance of the sodium hydroxide level equalizes with the reservoir fluids. When large amount of gas run through the scrubber, the fluids in the scrubber gain more Sodium Hydroxide and need to be sent to the reservoir.

There are float switches 612 and 600 in each of the generator housing and the scrubber housing. There are 4 floats magnetically triggered as shown in FIG. 7. The float switches send out signals to a power management system. The bottom float 708 is a termination float. If the water level in either housing is too low, this float is triggered aid a permanent failure is triggered. The power management system includes a timer for setting a period during which the status of the float switches is checked. If the float is still triggered, than the system shuts off immediately. There are 2 middle floats 704 and 706 on each float switch. The two middle floats maintain the level of water in the generator housing and the scrubber housing. When both floats are in the down (dropped), then the water pumps and solenoid are switch on. When the floats both rise up, then both the water pump and the solenoid are turned off. If the fluid levels reach the top float 702, then the power management system deems such a mode as a permanent failure and stops the power to the system terminates until the vehicle is turn off and back on. When the vehicle turns back on the power boards timer and relays for this termination look to see if the float is still made (raised up), and if it is, the system immediately tarns off until this situation is cleared. All of the water management system is located in a system box that includes both the generator housing and reactor cubes and anchored to the walls in appropriate locations. They all connect by water lines and electrical connectivity through the power board.

The fluid control system is based on the needs and usage of fluids for the decomposing into hydrogen and oxygen as directed by the other governing systems. All design aspects are pursuant to the use as outlined above and are proprietary designs based on the entire system operation and needs.

As shown in FIG. 6, the aqueous supply system includes a water and sodium hydroxide water reservoir 602. Specifically, filter water may be used. In an embodiment, filtered water is used. According to an embodiment, water may be filtered in a specific process whereby it first passes through a Reverse Osmosis filtration set up, and then passes through a Deionization filter to further eliminate physical and chemical materials reducing the water to a low-to-zero registration on a water meter. Sodium Hydroxide is then mixed into the water pursuant to chart amounts to control the setting of amperage in which the reactors built to. This amperage to the reactors is how the system sets amount of water decomposition and at what speed it occurs. In an embodiment, this mixing is done in a fillet tank (not shown) such as an aqueous solution transfer tank. Next, the water is transferred to the aqueous reservoir 602 attached to the system.

According to embodiment, shown in FIG. 2b three (3) pumps 230a, 230b, and 230c regulate fluid levels in the Generator House 210, and the Scrubber 218. In-line with each pump is a stainless steel solenoid valve 214a, 214b, 214c both activated simultaneously, to control fluid levels. As shown therein, a pump 230a adds aqueous solution from the tank 222 to the generator 208, another pump adds the aqueous solution to the scrubber 218, and a third water pump 230c draws liquid from the scrubber 218 for cycling each time the vehicle is turn off and back on. The solenoid valves 214a, 214b, 214c allow the system to maintain pressure in the generator house and scrubber when aqueous solution is being moderated. The pressure pushes the gas through the lines, the scrubber and into the venture against back pressure from the motor.

The following table provides a list of non-limiting exemplary parts, interconnections and functions or other notes that are used for the above-described water supply system. As will be appreciated, the listing of parts, interconnections, and functions are examples, and other comparable parts and/or interconnections as are known within the art are within the scope of the present invention can also be used and hence are not listed here.

| Part | Interconnection(s) | Function(s)/Note(s) |
| --- | --- | --- |
| Black ribbed automotive rubber hosing approved for use on large format vehicles × 10' | Connect pumps, reservoir, generator housing and scrubber housing | |
| Water Pumps 12 Volts 35 PSI × 3 having a delivery capability of one gal per minute | Connect between reservoir through the solenoid and to the generator or scrubber | |
| 12 VDC SS Solenoid Valves × 3 | Connect between reservoir and pumps | To maintain pressure in system when fluids are not being adjusted. |
| SS Water line clamps for hoses × 18 | C Clamps for connecting water line to reservoir, pumps, and solenoid valves | |
| SS metal Mounting bolts and nuts for pumps, and solenoid valves × 15 | Two types of bolts and nuts are used: one for water pumps which include SS washer and another for the solenoid valves that penetrate the back of the valve base. | All equipment listed here is attached to the side walls of the system box, which is also made of stainless steel. |

An embodiment of an air handling system according to an embodiment is described with reference to FIG. 2b. The air handling system includes an aqueous solution air intake filtration system and air intake delivery system.

One of the air delivery system's functions is to transport the hydrogen/oxygen mixture to the engine via the air delivery lines. During this transportation, the vapor gas is cooled and certain amount of Sodium Hydroxide is re-circulated back into the main aqueous solution reservoir via the scrubber.

The system uses a 100 PSI, 1.09 CFM compressor pump, which is anchored above the generator housing with a unique bracket bridge, just above the generator housing top. The compressor air pump 204 is connected to the vehicle engine's horn Air Intake, whose air has been filtered by the vehicle's air filter. The compressor pump 204 moves the air into the generator housing. One or more intake lines 912 and 914 enter the generator housing from two sides, each having a stainless steel one way check valve 913, 915. The air enters the generator housing from two sides and moves towards the middle of the generator housing where an output line 916 is located. The pressure transports the nascent vapor gas through a center hole in the middle of the generator top which connects to the air output line 916 that delivers vapor and air mixture to the scrubber 218, partially filled with aqueous solution and baffle plates. The vapor and air mixture travels through the scrubber, dropping off certain amounts of sodium hydroxide due to cooling and condensing of the vapor. The vapor subsequently exits the scrubber and enters the air intake tube just prior to the plenum, and is forced into a Venturi 226 to compress and saturate the incoming air. As outlined above, the connection lines are metal mess wrapped and tested at 1000 lbs of pressure.

In an embodiment, the air intake and delivery system is specifically designed for the deliver) of the vapor gas generated by the reactors and generator house. In contrast to other HOD systems, the compressor pump 204 of the present application delivers to the air intake manifold of an engine. In contrast, most systems deliver to the air intake horn where the air cleaning filter is and prior to the turbo, air cooler system and other sub-systems of a large format vehicle.

In the aqueous solution air intake filtration system, an Aqueous Solution Reservoir Air Intake Filter 908 is located inside the system box. A vinyl flex tube 910 is connected to this filter and runs out of the system box, and attaches to a connector on the aqueous solution reservoir. The reservoir must have an air intake to keep front cavitating when water is drawn from it. There is a stainless steel housing protecting this filter 908. Dirt and debris from the air can cause additional reactions when it enters the water and then is delivered to the generator house. These additional minerals and contaminants cause the system to build up contaminants in the reactor interiors and eventually will cause the shut down of the system, and may harm the system health.

Gas Delivery Compressor Air intake—the system draws its air form the vehicles' Air Intake Tube or Air intake Horn, where a compression fitting is installed just after the air horn filter 911, thus maintaining clean air which enters the compressor 204.

FIG. 2b illustrates a gas delivery system and a water circulation system according to an embodiment of the present disclosure. The gas delivery system in FIG. 2b includes an air pump 204 that takes air from the air intake line 909 of the engine alter the air is filtered by the vehicle air filter. The air pump 204 pushes the air into the generator housing 208 through two air lines 912 and 914, whose inlets 913, 915 to the generator housing 208 are located at two sides of the generator housing 208. The air and gas mixture in the generator housing is pushed from the two sides where the air lines enter the generator housing to a center line 920 that is at the center of the generator housing 208. The center line 920 transports the air and gas mixture as well as trace amount of sodium hydroxide into the scrubber 218 that cools the mixture and breaks larger mixture bubbles into smaller ones. The mixture in the scrubber 218 is first directed to the bottom of the scrubber 218 through an elbow pipe, then passes through a plurality of baffles having perforations. During the gas mixture travelling through the scrubber 218, it is cooled and water vapor is condensed back into liquid forms. The trace amount of sodium hydroxide also dissolves in the large volume solution of the scrubber. The gas mixture exits the scrubber 218 through a port on the top of the scrubber 218 and enters the engine air intake line 922 that transports the gas mixture to the engine intake 912.

The air line is a 1000 lb pressure tested wire mesh wrapped air line from traditional large rig vehicle after-market manufacturers. This line runs into the intake side of a 200 psi max, 1.09 CFM, compressor pump. The pump 204 is anchored on a support bracket in the system box, located above the generator house. A stainless steel one way valve fitting 913, 915 is used on either end of the generator house 218, connecting to the top of the generator house. These are the intake lines for pressure into the generator house. The pressured air moves across the surface of the water inside the generator house, mixing with the nascent hydrogen and oxygen gases, and will the vapor materials, and the combined gas vapor moves up through an exhaust port in the center of the generator house top 209, where there is another compression fitting attached to the same 1000 lb pressure tested stainless steel mesh wrapped pressure exhaust line, which then transports the mixed gas vapor to a stainless steel scrubber 218. In an alternate embodiment (as shown in FIG. 2A, 220), a safety water lock can be added before the vapor and gas mixture enters the Venturi 226.

The water circulation system in FIG. 2b mainly regulates the water movement in the water tank 222, the generator housing 208, and the scrubber 218. The water tank 222 provides water to other parts of the system through one or more water lines, shown as two water lines 928, 926, at the bottom or the water tank 222. The two lines 926 and 928 which connect to the generator housing 208 and the scrubber 218 respectively. The water line 926 enters the generator housing 208 from the upper part of the generator housing. The water line 928 also enters the scrubber 218 through a port 932 at the upper part of the scrubber 218. The scrubber 218 allows solution to cycle back to the water tank 222 through a water line 930 that connects to the lower part of the scrubber 906.

Figure 15:
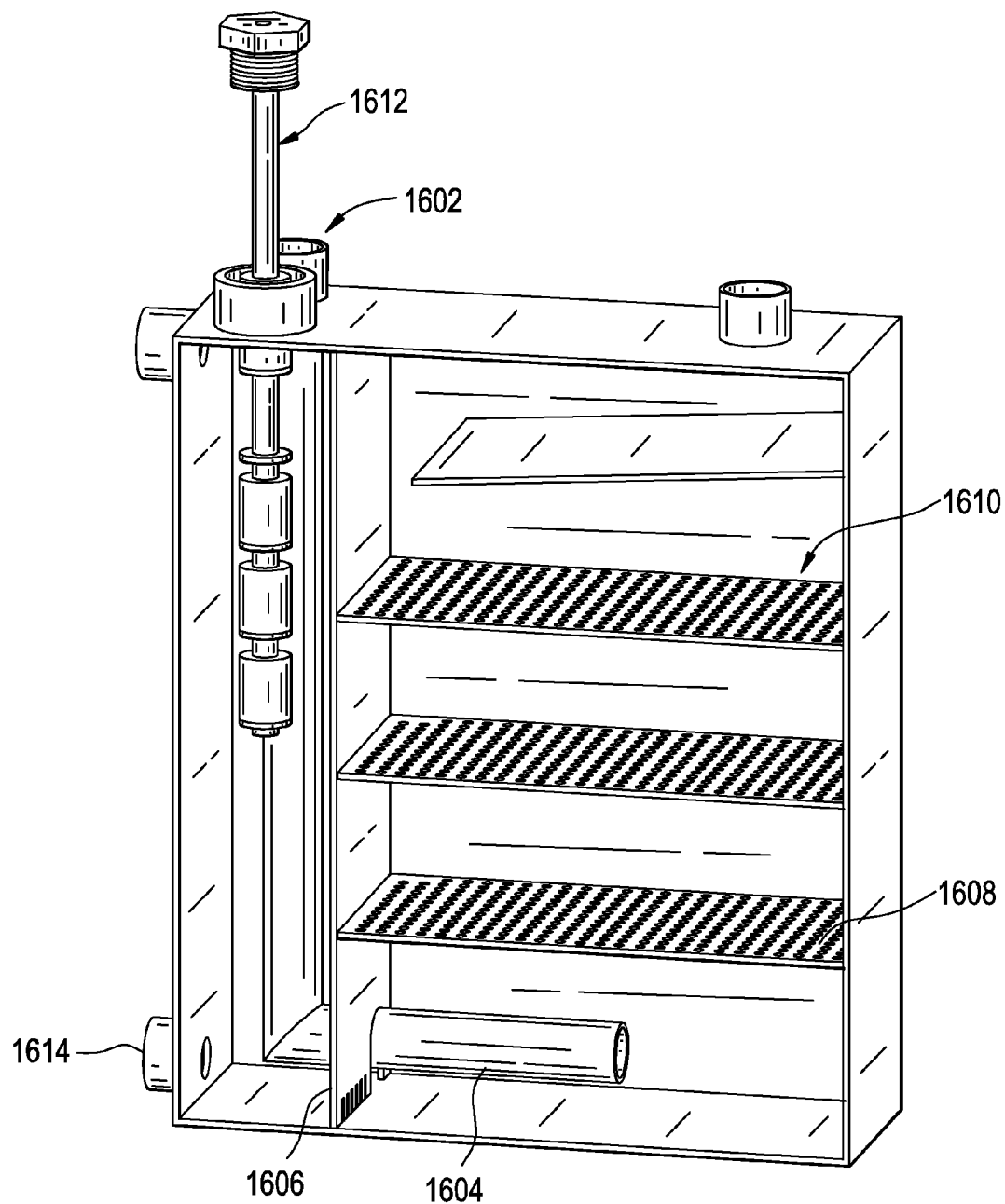
FIG. 15 illustrates a scrubber according to an embodiment of the present disclosure.

FIG. 15 shows a construction of the scrubber according to an embodiment of the present invention. The line connects to a top brass fitting 1602 on one side of the scrubber. Interiorly, a stainless steel tube 1604 is braised to the interior of the side wall of the scrubber, and then makes a 90 degree bend downward towards the bottom of the vessel. A separator wall 1606 divides the space where the intake tubes travels downward to the bottom form the volume of the scrubber where the gas vapor bubbles up on the other side of the separator wall. The tube bends 90% at the bottom where it follows the bottom to the middle of the scrubber width. At the end of scrubber gas vapor delivery tribe is exhaust perforations 1608 to break the gas vapor into small bubbles as it exits the tube. These small bubbles travel upward through a volume of water, thus cooling down from the reaction in the generator house, dropping loose water vapor to be recycled back into the aqueous reservoir, and allowing some of the sodium hydroxide bonded in the skin of the bubbles to leach out into the water. There are a plurality, such as six (6), of baffles 1610 braised to the walls of the scrubber, intermittently up the length, and installed a slight pitch in an upward direction. According to an embodiment, small spaces are used at one end of each baffle plate, and these spaces alternate every other baffle. The first, two (2) primary baffles also have perforations through out the baffle plate to allow gas vapor to work through the small openings and further break apart. This back and forth motion of the gas vapor allows for the cooling, condensing, and sodium hydroxide reduction to occur, in the same space where the gas vapor intake tube is located is a float switch assembly 1612. The float switch will terminate the system in the event that the high float un-makes or the low float makes. The two (2) middle floats regulate the level of the water. The scrubber is also hooked to a recycling pattern in relays set up on the power board. Each time the vehicle is turned off and restarted the scrubber cycles its fluids back to the aqueous reservoir through a recycling outlet 1614, and refills the volume with new aqueous solution from the reservoir.

As shown in FIG. 10, when the gas vapor exits the scrubber through a compression fitting and travels down the compression tubing (1004) as outlined before, it connects to a stainless steel one way check valve attached to the intake line of a delivery tube (1002) such as a Venturi or Vortex, which saturates the incoming gas vapor with the incoming air in the air tube where it continues into the air intake manifold, and then to the combustion chambers.

The following table provides a list of non-limiting exemplary parts, interconnections and functions or other notes that are used for the above-described air delivery system. As will be appreciated, the listing of parts, interconnections, and functions are examples, and other comparable parts and/or interconnections as are known within the art are within the scope of the present invention can also be used and hence are not listed here.

| Part | Interconnection(s) | Function(s)/Note(s) |
|---|---|---|
| ¼ ID Gas Transportation Line tested at 1000 lbs pressure and metal mess wrapped for durability × 15' | Used between the horn air intake, vacuum/compressor pump, generator housing, scrubber housing, and inline Venturi at the air intake tube just prior to the engines plenum | |
| ⅜ Stainless Steel One Way Valves × 6 each | 1 is located at the Air Horn intake side, 3 are located on the top of the generator, 2 for intake into the generator, 1 for exhaust from the generator, 1 located at the at the intake side of the Venturi | These valves prevent a backward flow of vapor gas and air. |
| ⅜ compression fitting where the air line connects to each component × 13 | They connect air lines with other lines or valves or outlets. | |
| Vacuum/Compressor Pump at 100 psi and 1.09 CFM | Connect to air lines | Produce pressure or vacuum in air lines. |
| Air Intake Rubber Hosing × 15' | Connect the vehicle horn air intake to the intake of the vacuum/compressor | |

The present system also includes a plurality of safety sensors and measures. For example, the present system includes three pressure sensors. The first sensor is the oil pressure sensor located at the engine block. This is a 10 lb psi sensor which monitors pressure on the rise. When the engine reaches 10 lbs psi, then the switch is made and the system can be turned on.

The second pressure sensor is located on top of the generator housing. This sensor is set at 38 lbs psi on the rise. If the pressure in the generator house increases above that setting then the system will be permanently shut down until the engine is restarted. The system will be shut down again if the pressure again stays too high.

The third sensor is located in the gas delivery line near the engine. The sensor is set at 35 lbs, if the pressure in the sensor goes above 35 lbs the system will be permanently shut down until the engine is restarted. If the pressure is still too high the system will be shut down again until this problem is rectified.

FIG. 10 illustrates an exemplary installation of the present system in a vehicle. A system including a water reservoir 1102 and the system box 1104 that includes both the generator housing and the reactor units was installed under the bed of a truck. It is noted that the system could be installed at a plurality of suitable locations in a vehicle including under the hood, in the trunk, under the truck bed, or on top of the roof. As noted herein, this system box 1104 can includes everything sub-systems, and materials for the HOD system (See FIG. 1, reference 120). It is self-contained except for the power source and water reservoir 1102.

Figure 11A:
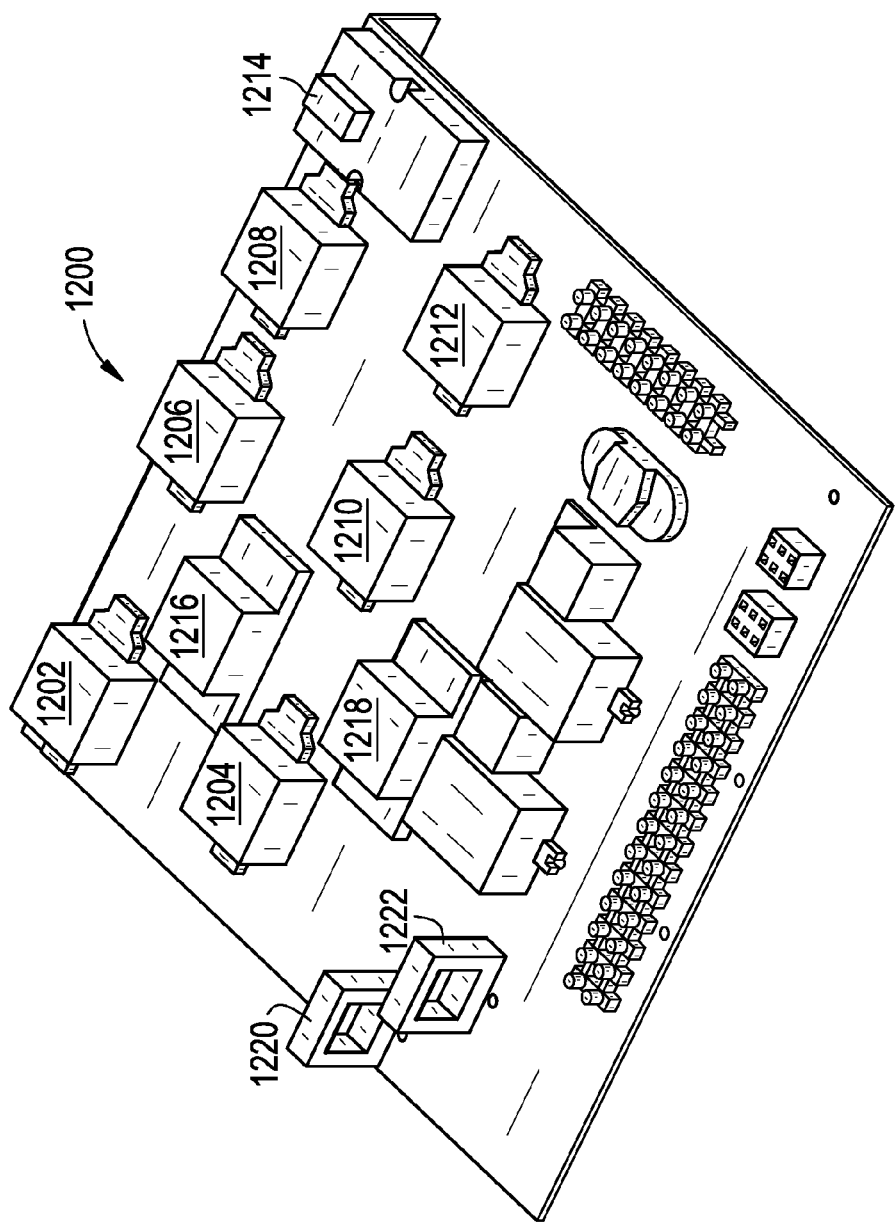
FIG. 11A illustrates a power board according to an embodiment of the present disclosure.
Figure 11B:
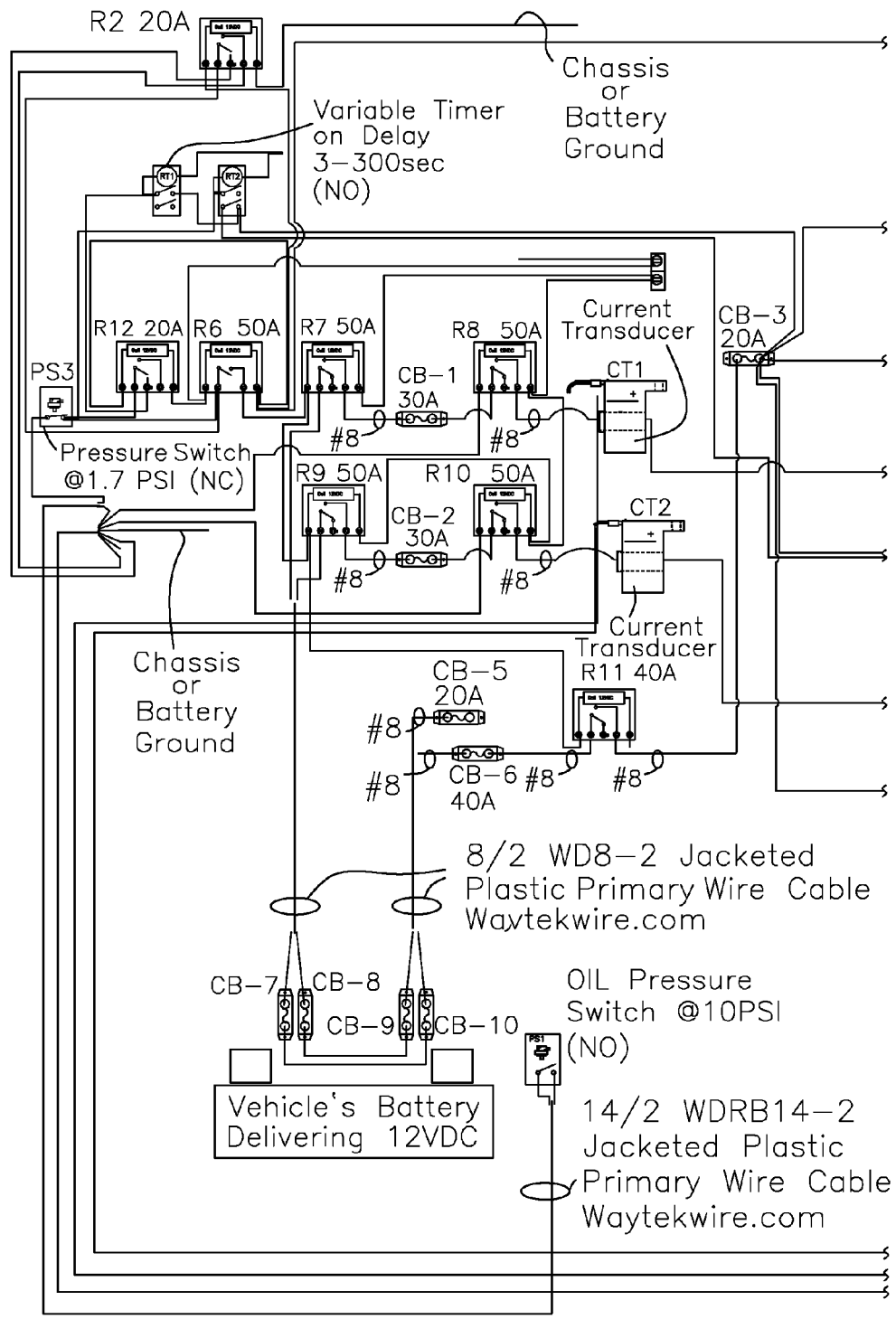
FIGS. 11B-11C illustrate an electrical diagram of the power management system according to an embodiment of the present disclosure.
Figure 11C:
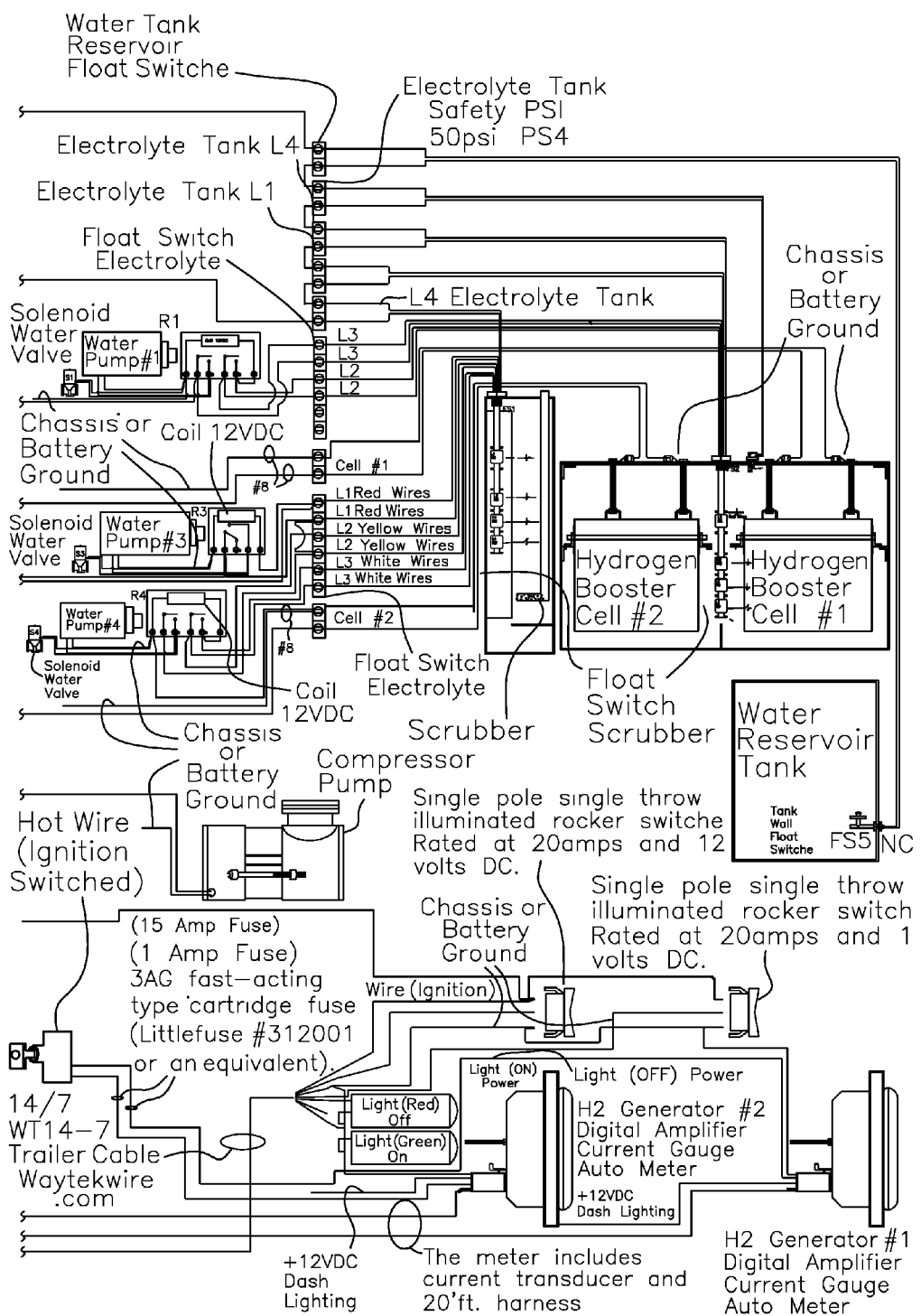

According to an embodiment, the present system also includes a power management board, shown in FIG. 11. The power management board includes the assembly of all breakers 1216 and 1218, relays 1202, 1204, 1206, 1208, 1.210, and 1212, variable timers 1214, current transducers 1220 and 1224 and circuitry which manage high and low electrical power, regulating the two (2) reactors' electrical needs, as a well as all other electrical controls for various sub systems i.e. water management pumps, water management stainless steel solenoid valves, and air compressor gas delivery. According to a preferred embodiment, the power board has two variable timers: one is at the front; and the other is at the back of the power board. The power board is a stainless steel flat platform with prescribed openings drilled in the platform designated for mounting various electrical breakers, relays, and solid state timers, which together regulate and manage electrical power to all sub systems and needs.

In an embodiment, the system power derives from the battery set of the vehicle in which the mobile system is installed on. The power lines are heavy duty extruded lines rate to the necessary electrical capacity for the highest setting of the reactors of 80 amps per reactor. According to an embodiment, solid copper connectors are used to connect the breakers and relays for the reactors only. According another embodiment, No. 2 heavy duty extruded automotive cable lines are preferred to be used as the power transfer lines from the battery set to the system box to handle the high current white solid copper connectors are used between reactor breakers and reactor relays. The power lines connect through a breaker gateway. The power lines connect into the HOD system box where they enter the box through the back. There is a terminal connection panel inside the system box on the right side wall, where the power lines terminate. Shorter power line leads leave the terminal, curving around the Power Board. The lines then lace through voltage readers on the anode line, then to high amperage breakers, and the cathodes terminate at the breakers directly.

The power management board may be made of any materials suitable for structural support known to a person of ordinary skill in the art. According to an embodiment, the power management board is made of 12 gauge stainless steel. There are openings drilled in the board to attach various line amperage readers, breakers, relays, timers and terminal strips. Through these series of controls all functions of the system are managed including: power to reactors, power to water pumps, power to compressor pump, power to solenoid valves, power and readings to the digital gauges located in the cab of the vehicle. The power board regulates all power in the system as it is attached to the 12 volt battery of the vehicle. The larger power lines enter the back of the system box and tie off on a terminal strip. The reactors are then energized by four (4) heavy duty #2 extruded automobile electrical lines which connect to the anodes and cathodes of each reactor. The lines connect first to a heavy duty 80 amperage breaker and then go to the anode or cathode of the reactors. A current transducer is attached to the anode line and reports to the digital gauges in the dashboard of the vehicle. The breaker shut the system down automatically if they over heat.

The following table lists certain components used in the power board. The following table provides a list of non-limiting exemplary parts, interconnections and functions or other notes that are used on the power board. As will be appreciated, the listing of parts, interconnections, and functions are examples, and other comparable parts and/or interconnections as are known within the art are within the scope of the present invention can also be used and hence are not listed here.

| Part | Interconnection(s) | Function(s)/Notes |
| --- | --- | --- |
| 80 Amp Mid Range Auto Reset Breakers× | They connect between the lines coming from the battery set and the reactors | |
| 20 Amp Mid Range Auto Reset Breakers × 6 | | |
| Solid State 30 Amp Timers | 1 timer used to monitor system start up for problems and 1 timer used to monitor scrubber float switch for failures | |
| 75 Amp Relays × 6 | Used in regulating the reactors | |
| Oil pressure sensor 10 lbs psi on the rise | Connect to the power board | Engine oil pressure sensor for sensing oil pressure. These pressure sensors are heavy duty military grade |
| Gas pressure sensor 35 lbs psi on the rise | Connect on the top of the generator house monitoring the generator internal pressure and also connect to the power board | Monitor the pressure in the generator housing. |
| Gas pressure sensor 35 lbs psi on the rise | Connect inline of the gas delivery line between the engine and the scrubber | Monitor the pressure of air lines. |

FIG. 11*b* schematics showing electrical components and connection diagrams of the power management system to utilize power during an operation of the system. The power management systems as shown in FIG. 12*b* manages powers of the creator unit, water reservoir tank, compressor pump, water pumps and current gauge auto meter at the dashboard. The power management system includes a plurality of relays such as R1 to R12, circuit breakers such as CB-1 to CB10, current transducers such as CT1 and Ct2, variable timers RT1 and RT2, and a plurality of connectors such as L1 to L4. The power management system also receives signals from a plurality of sensors including of pressure switch, float switch, tank wall float switch, and pressure sensor of the generator housing and controls the electricity generated by the vehicle's battery to various components of the system. According to en embodiment, the normal operation current of the system is between 10 to 15 Amps. According to another embodiment, the power management system is capable of handling operation current as high as 160 Amp (80 Amp for each reactor unit).

Figure 12A:
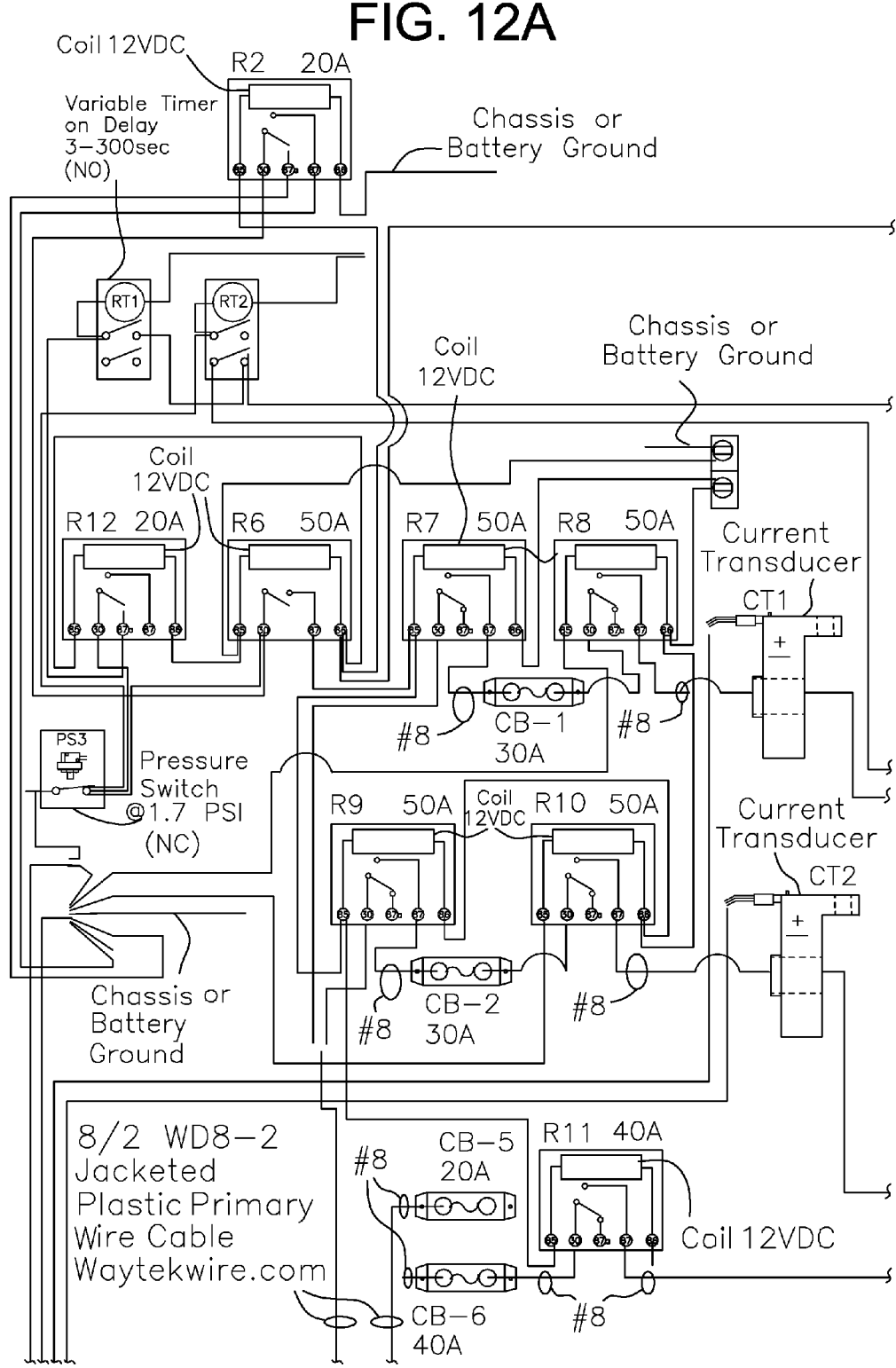
FIGS. 12A-12B illustrate an enlarged portion of the electrical diagram of FIGS. 11B-11C.
Figure 12B:
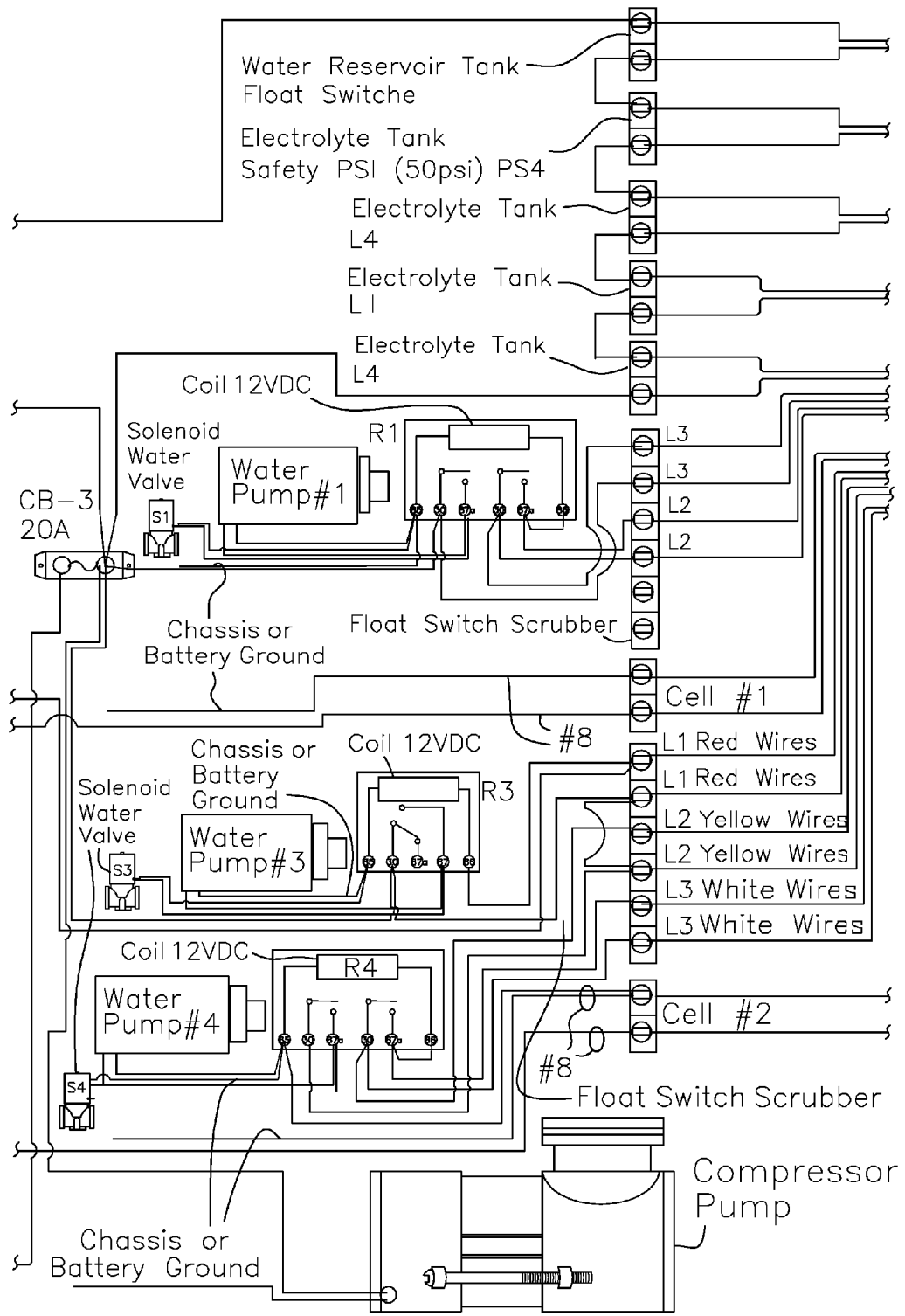

FIG. 12 illustrates the schematics corresponding to those included in the power board. Note that compressor pump, water pumps and corresponding solenoid water valves are not included in the power board.

According to an embodiment, two variable timers are used in the present system: RT1 and RT2. The variable timer RT1 is exclusively connected to the variable timer RT2, which is connected with a plurality of sensors such as the in line pressure sensor, the float switch, generator housing sensor, tank wall float switch, and the oil pressure sensor. The variable times RT1 has a time delay period between 0 and 15 seconds and is configured to be used to shut off the system when any of the sensors indicates a danger of the system. For example, the variable timer RT1 may provide connection for only five seconds, during which the sensor signals are monitored. At the end of the five send period, the timer RT1 will cut off the connection. During the five second period, if no problem is detected, the system will be kept on. But, if any of the sensors indicates an unsafe pressure or water level, the system may be shut down. The tinier RT2 allows the system to continuous monitor the signals of the sensors during operation of the system.

According to an embodiment, current transducers CT1 and CT2 are used to measure the current in the anode cable and produce a signal indicating the measured current. But, when the system is operated in the range of 10-80 Amps, such a high current should be reduced before it is sent to the digital current meter to display the current reading. The current transducer measures the actual current, but produces a signal with much smaller current level to the digital current meter in order to safely display the actual current of the system.

Figure 13A:
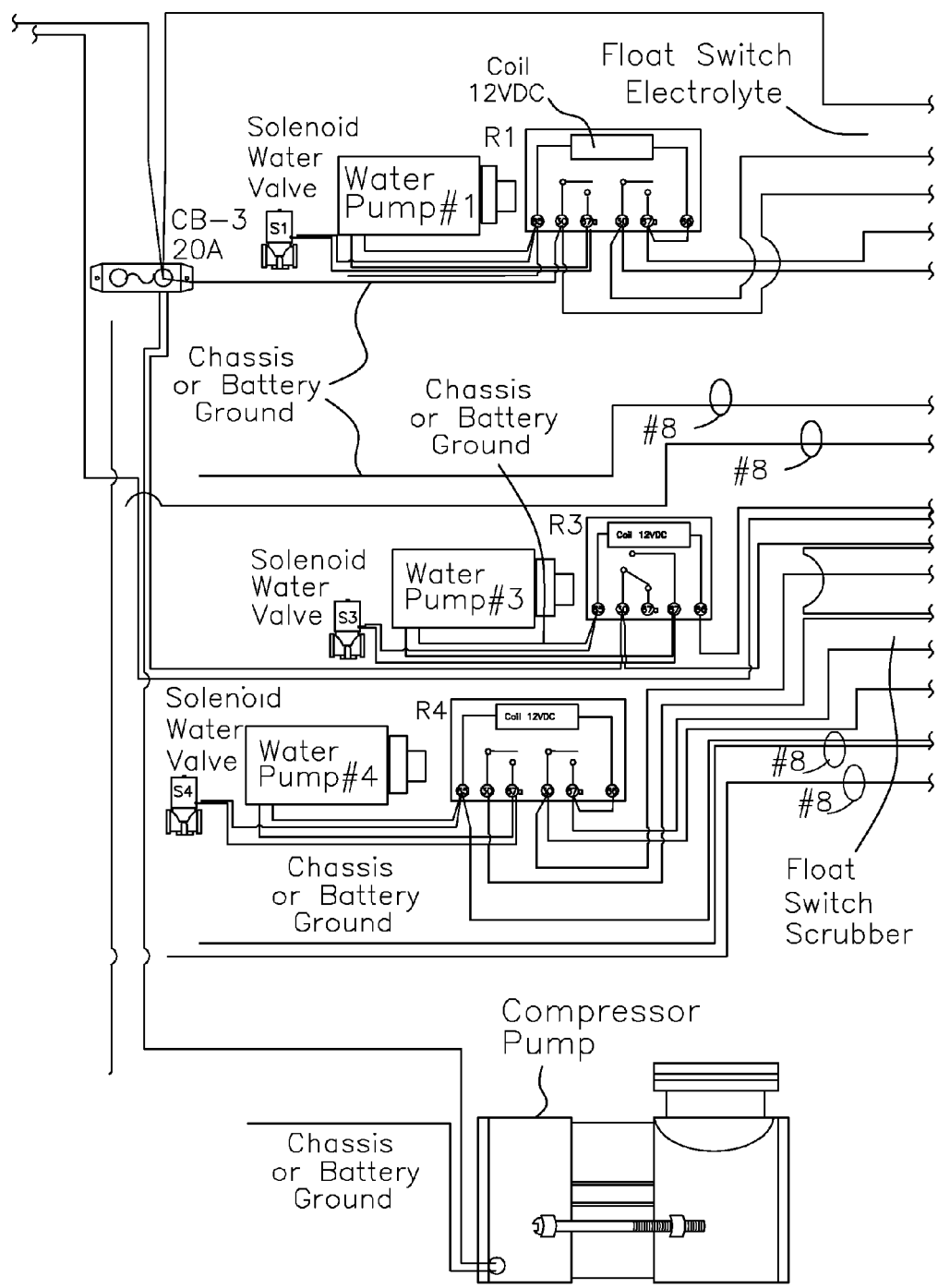
FIGS. 13A-13B illustrate an enlarged portion of the electrical diagram of FIGS. 11B-11C.
Figure 13B:
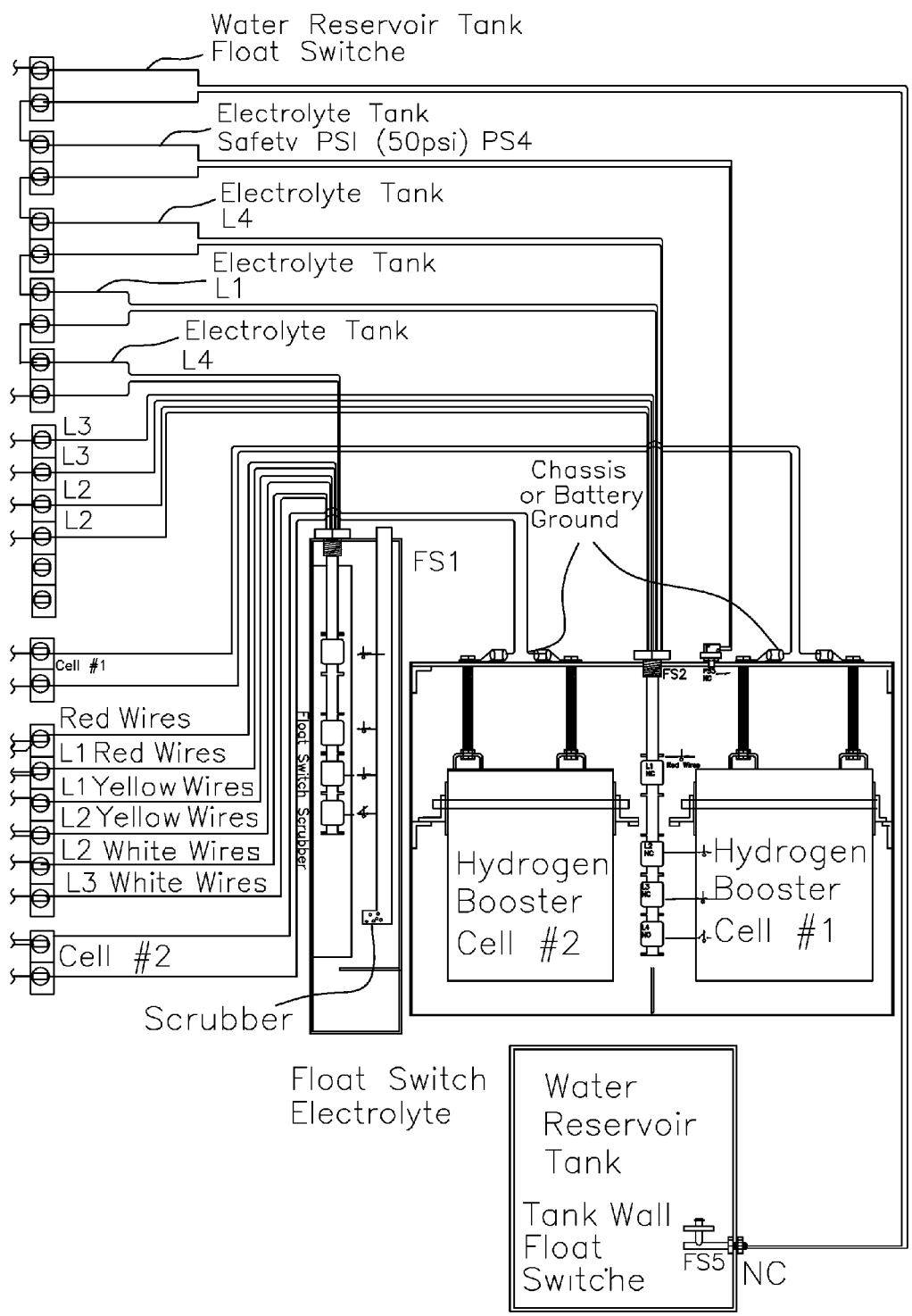

FIG. 13 illustrates the electrical connections from the reactor units to the power board.

According to an embodiment, the system includes a generator housing float switch 1402 and a scrubber float switch 1404. Each float switch produces three signals through three pairs of wires. The generator housing float switch 1404 has three pairs of wires: G1, G2, and G3. The scrubber housing float switch also has three pairs of wires S1, S2, and S3. According to an embodiment, G1 and S1 are connected to the top float; G2 and S2 are connected to both of the two middle floats; and G3 and S3 are connected to the bottom float. These wires of the float switches send signals to the relays (R1, R3, and R4) of the water pumps (#1, 3, and 4) in order to control the water levels of the scrubber or generator housing. These wires also send signals to the system relays (such as R2) so that the system may be turned off during emergency or malfunction.

Figure 14:
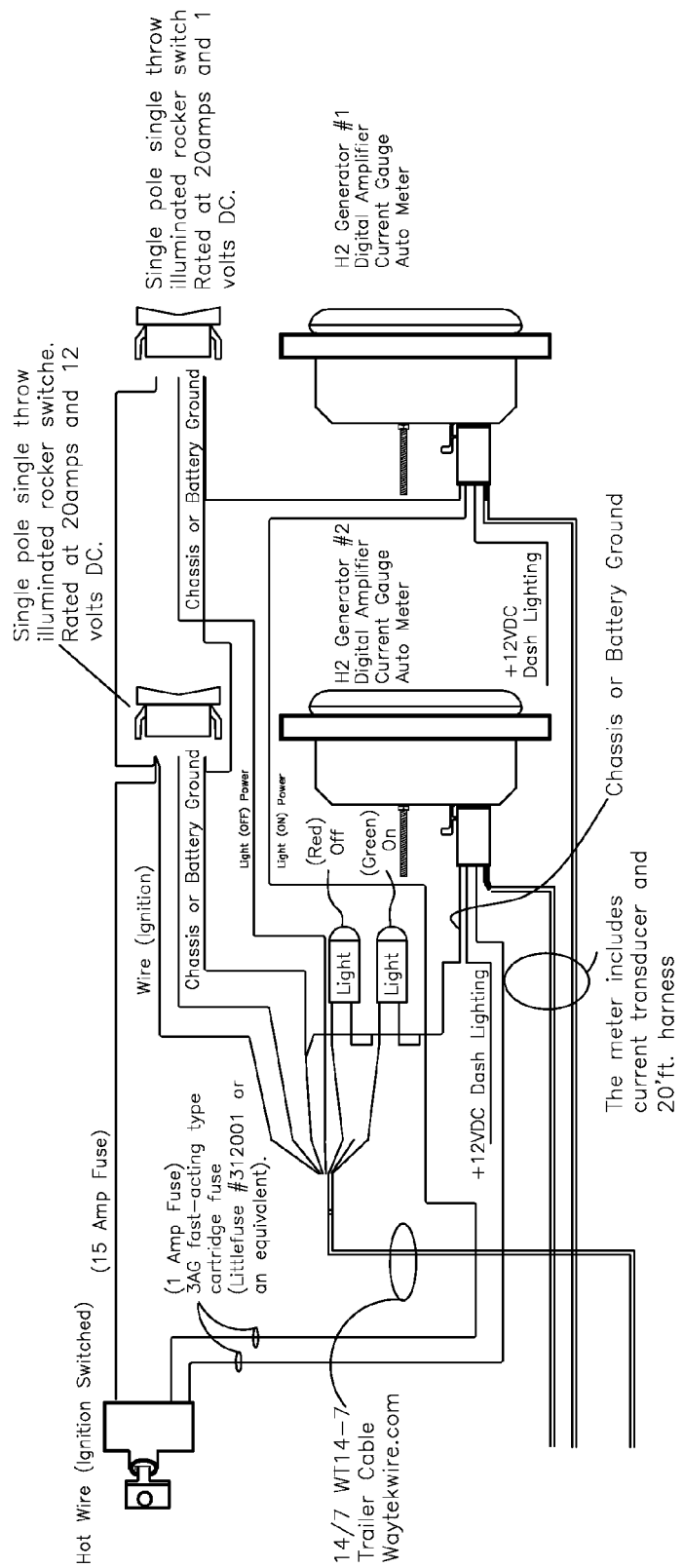
FIG. 14 illustrates an enlarged portion of the electrical diagram of FIG. 11B.

FIG. 14 illustrates the electrical connections from the power board to the dashboard. The system includes a dashboard monitor 1500 to show the status of the generator system. According to an embodiment, the dashboard monitor includes two current gauge auto meters and dashing lighting. When the system is on, the clash lighting may illuminate a green light. When the system is off, the dash lighting may illuminate a red light. The current gauge auto meter is used to show a digital reading of the current during the operation or the system.

Figure 16:
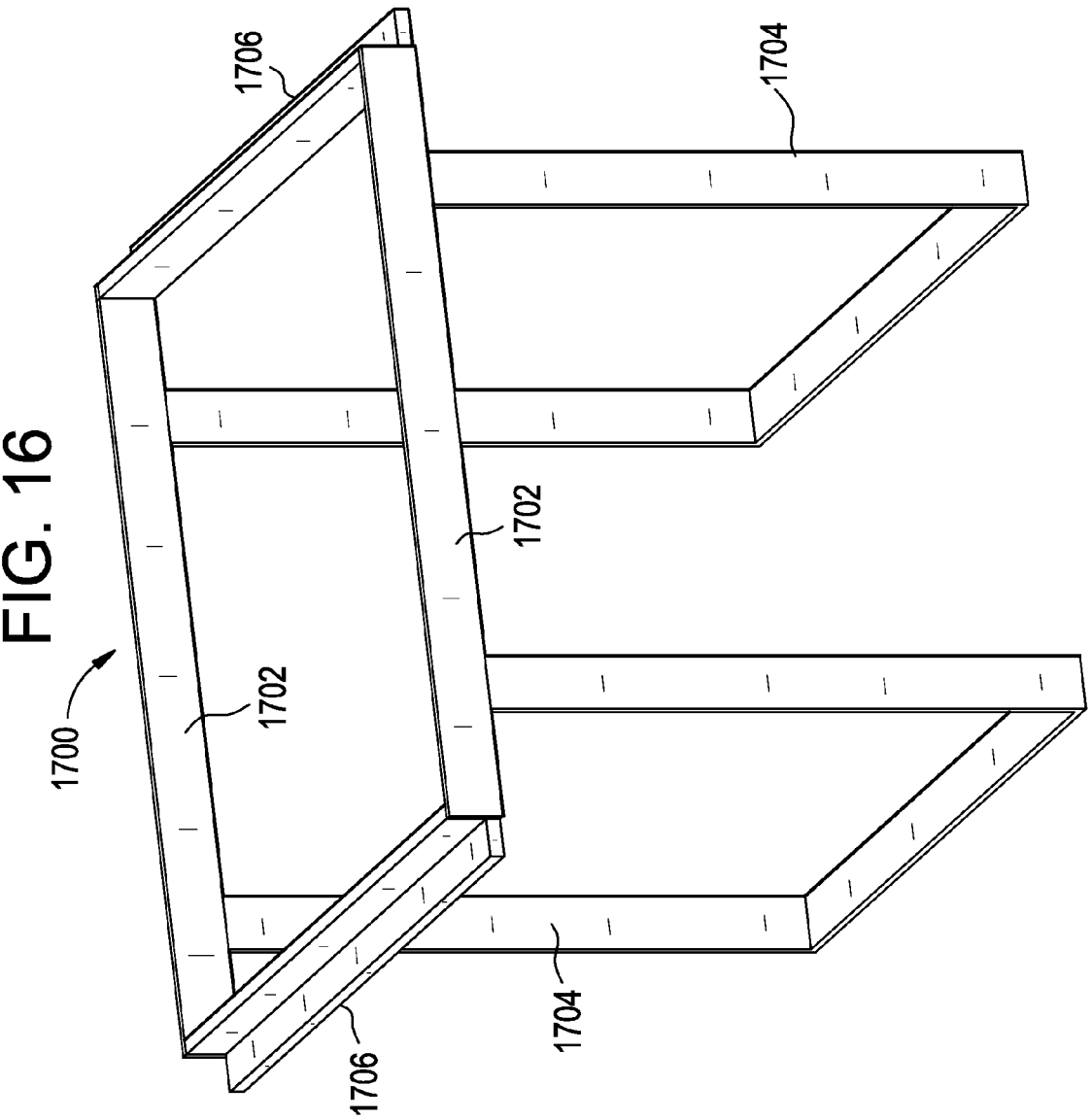
FIG. 16 illustrates a Generator House Reactor Bracket general bracket according to an embodiment of the present disclosure.
Figure 17:
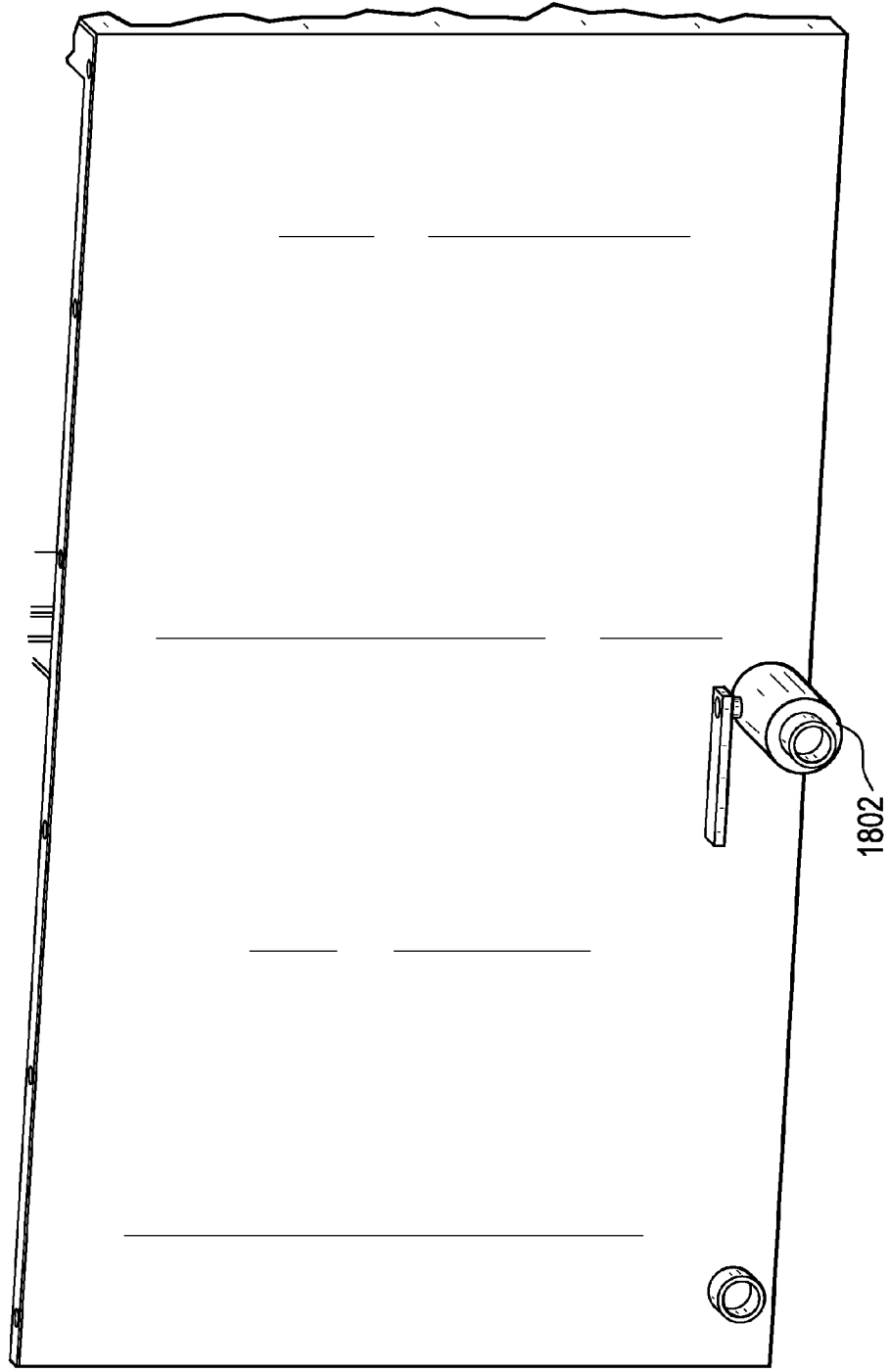
FIG. 17 illustrates a side view of the generator housing according to an embodiment of the present disclosure.

FIG. 16 illustrates a reactor bracket for holding the reactors in the aqueous solution inside the generator housing. The reactor bracket 1700 includes a top frame 1702, a supporting frame 1704, and a reinforcing plate 1706 between the top frame 1702 and the supporting frame 1704. The top frame 1702 forms a contour similar with that of the container and reactor unit (FIG. 2a, FIG. 2b, 210) so that the reactor unit may fit in snugly in the generator housing (FIG. 2a, FIG. 2b, 208). The reinforcing plate 1706 is used to strengthen the connections between the top frame 1702 and the supporting frame 1704. The reinforcing plate may also be used to reinforce the connections between the supporting frame 1704 and the base.

The following table lists additional electrical components used in FIGS. 11b-13. The following table provides a list of non-limiting exemplary parts, interconnections and functions or other notes that are used on the power board. As will be appreciated, the listing of parts, interconnections, and functions are examples, and other comparable parts and/or interconnections as are known within the art are within the scope of the present invention can also be used and hence are not listed here. For example, while 75 Amp relays are described for certain of the relays, the amperage for the relays can be at any range sufficient for to perform, for example in the range of range of from 20 Amps to 80 Amps.

| Part (POWER BOARD) | Position | Interconnection(s) | Notes/Function(s) |
|---|---|---|---|
| R2-20 AMP Single Pole Double Through Relay | 11 | Detect the system active or inactive status and report with a Red or Green light in the vehicle dash board | |
| RT1-Solids State Double Pole Double Through Variable Timer | 4 | FRONT BOARD Detect the Generator High Pressure PSI Switch and oil pressure 10 lb PSI activation switch and allows continued operation if both switches are functioning correctly | Timer has a 3-15 sec delay and is used upon starting of the system. During this delay period, the accumulated oil pressure and generator housing pressure are detected. |
| RT2-Solids State Double Pole Double Through Variable Timer | ON BACK | BACK BOARD All high level and low level float switches run through this timer in series | Continuously monitor the system for permanent failure and momentary failure. Reset system upon momentary failure. |
| R12-Tyco Single Pole Double Through 12 V 75 AMP Relay (6) | 3 | Activate RT1 Timer | |
| R6-Tyco Double | ON | BACK BOARD Activate power | |

| Part (POWER BOARD) | Position | Interconnection(s) | Notes/Function(s) |
| --- | --- | --- | --- |
| Pole Double Through 12 V 75 AMP relay | Back | to the water bounce timer | |
| R8-Tyco Single Pole Double Through 12 V 75 AMP Relay | 1 | Activate final path of power from board to the reactor. | |
| R7-Tyco Single Pole Double Through 12 V 75 AMP Relay | 2 | Activate power to breaker CB 1 | |
| CB1-Bausch 80 AMP Reactor 1 Breaker | 5 | Activate power to R8 Relay to power Reactor 1 | |
| R10-Tyco Single Pole Double Through 12 V 75 AMP Relay | 6 | Activate power to reactor 1 | |
| R9-Tyco Single Pole Double Through 12 V 75 AMP Relay | 7 | Activate power to breaker CB2 | |
| R11-Tyco Single Pole Double Through 12 V 75 AMP Relay | 8 | Activate power to breaker CB3 | |
| CB1-Bausch 80 AMP Reactor 2 Breaker | 9 | Activate power to R10 to power reactor 2 | |
| R1-Tyco Double Pole Single Through 12 V 30 AMP Relay | 10 | Activate pump 1 and S1 | |
| R4-Tyco Double Pole Single Through 12 V 30 AMP | 12 | Activate pump 4 and S4 | |
| R3-20 AMP Single Pole Double Through 12 V Relay | 13 | Activate pump 3 and S3 | |
| CB3-12 V 30 AMP Breaker | 14 | Activate all the pumps and solenoid valves and the air compressor | |
| CT1 Line reader transducer | 15 | Read current delivered to reactor 1 | |
| CT2 Line reader transducer | 16 | Read current delivered to reactor 2 | |
| Float Switch Connector 1 | 17 | Connection for the float switch to the generator house | |
| Float Switch Connector 2 | 18 | Connection for the float switch to the scrubber house | |

FIG. 18 illustrates a system box according to an embodiment of the present disclosure. The system box includes a main box 2004, a bottom plate 2012, and a bracket 2016. The main box 2004 has a hinged door 2002, top sockets 2008 and bottom socket 2010 for securing the inside components, and a plurality of vents 2006 for heat dissipation and air circulation. The bottom plate 2012 provides support for an external water tank or reservoir. The bottom plate 2012 is secured to the main box 2004 at the bottom of the main box 2004. Reinforcement may be used to strengthen the connection between the bottom plate 2012 and the main box 2004, such as the angled bracket 2014 and the square bracket 2018. The bracket 2016 may be used to attach a strap to secure the water tank or reservoir. The water tank or reservoir connects to the components inside the system box through a water filter 2020 at the back of the system box. In an embodiment, the system box is made of stainless steel. In another embodiment, the system box is made of polymeric materials. In another embodiment, the system box is made of any structural material that provides adequate stringing in protecting the inside components.

Figure 19:
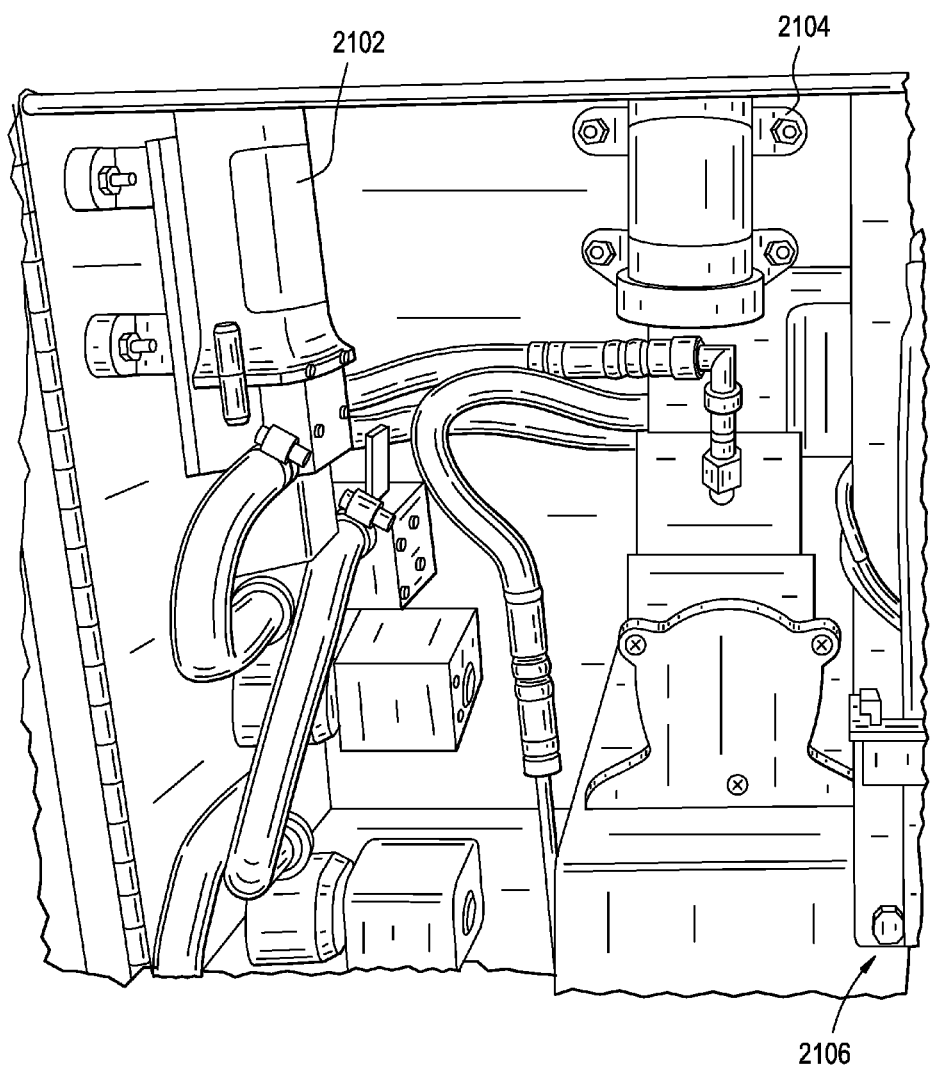
FIG. 19 illustrates exemplary components inside the system box according to an embodiment of the present system.

FIG. 19 illustrates exemplary components inside the system box according to an embodiment of the present system. As shown in FIG. 19, water pumps 2102, an air compressor pump 2104, a generator housing 2106, and connection lines among these components are all installed inside the system box.

Accordingly, while the invention has been described and illustrated in connection with preferred embodiments, many variations and modifications as will be evident to those skilled in this art may be made without departing from the scope of the invention, and the invention is thus not to be limited to the precise details of methodology or construction set forth above, as such variations and modification are intended to be included within the scope of the invention. Therefore, the scope of the appended claims should not be limited to the description and illustrations of the embodiments contained herein.

What is claimed is:

1. A system for an engine, comprising:
a generator housing containing at least one Teflon reactor cube designed to house a plurality of electrode plates;

the plurality of electrodes comprising cathodes, anodes and neutrals plates made of stainless steel, or other similar electrically conductive materials;

inside the Teflon reactor cube, each electrode plate is perfectly held in place after being slid into embedded grooves carved into four primary Teflon walls, with an exception of two side walls which have no carved grooves; these grooves create protrusions that insulate and stop shunting and shorting effects inside the reactor cube;

between each electrode plate held in place in these grooves, the protrusions act as insulating barriers between the electrode plates, and in which are bored micro-holes so that no plate edge is exposed to another plate edge adjacent to it as a result of holes being present;

each top and bottom walls has a row of numerous openings which span most of the width between the protrusions; this critical design allows for gas to escape a cell area between plates and water to be drawn into cells between plates for replenishment and circulation;

the top wall holes act as exhaust ports for escaping gas and accompanying water or aqueous solution, and the bottom wall holes act as intake ports for water or aqueous solution which is drawn in by an automatic circulation created when suction is generated from escaping gas out of the exhaust ports in the top wall;

these exhaust ports and intake ports allow for a Torus pump effect; when at least one reactor cube is completely submersed into water or aqueous solution within the generator housing, and when the anode and cathode plates are attached to electrical current, an energy field is generated between and amongst all of the electrode plates on the inside of the reactor cube to cause decomposition of the water into hydrogen and oxygen; when the gas rises and moves out of the exhaust ports it carries an amount of water with it; the gas continues to rise and is swept away by flowing air above the water level in the generator housing, while the heavier water moves to the sides of the cube, then circulates back downward, a portion is mixed with new water and is drawn back into the cube through the intake ports fulfilling the Torus effect;

the anodes and cathodes all have a small connector tab which protrude upward penetrating out of the top wall through cut openings; the connector tabs are used to connect all anodes to each other and all cathodes to each other outside of the cube, and then they are firmly attached in series by a stainless steel, or other conductive material, connector bolt which in turn is insulated with a polymer paint and then covered with Teflon covers to complete the insulation of all possible shorts and shunts in and around the cube submersed in the water or aqueous solution.

\* \* \* \* \*